(12) United States Patent
Asukai et al.

(10) Patent No.: US 8,139,943 B2
(45) Date of Patent: Mar. 20, 2012

(54) OPTICAL COMMUNICATION APPARATUS AND OPTICAL COMMUNICATION METHOD

(75) Inventors: Masamichi Asukai, Kanagawa (JP); Kan Ebisawa, Kanagawa (JP); Yoichiro Sako, Tokyo (JP); Masaaki Tsuruta, Tokyo (JP); Taiji Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 742 days.

(21) Appl. No.: 12/009,201

(22) Filed: Jan. 17, 2008

(65) Prior Publication Data

US 2008/0260391 A1  Oct. 23, 2008

(30) Foreign Application Priority Data

Jan. 19, 2007  (JP) ................................. 2007-010273
Apr. 24, 2007  (JP) ................................. 2007-113964

(51) Int. Cl.
*H04B 10/00* (2006.01)
(52) U.S. Cl. ........................................................ 398/118
(58) Field of Classification Search .................. 398/107, 398/108, 118, 169
See application file for complete search history.

(56) References Cited

U.S. PATENT DOCUMENTS

| | | | | |
|---|---|---|---|---|
| 5,648,862 A * | 7/1997 | Owen | ............................ | 398/128 |
| 5,710,652 A | 1/1998 | Bloom et al. | | |
| 6,154,298 A | 11/2000 | Tamagawa | | |
| 6,154,299 A * | 11/2000 | Gilbreath et al. | ............. | 398/170 |
| 7,298,268 B2 * | 11/2007 | Zimmerman et al. | ..... | 340/572.1 |
| 7,548,697 B2 * | 6/2009 | Hudson et al. | ................ | 398/106 |
| 2002/0045454 A1 | 4/2002 | Iwata | | |
| 2006/0062582 A1 * | 3/2006 | Suzuki et al. | ................. | 398/183 |
| 2007/0132592 A1 * | 6/2007 | Stewart et al. | ............. | 340/572.8 |
| 2007/0176744 A1 * | 8/2007 | Park et al. | ..................... | 340/10.1 |

FOREIGN PATENT DOCUMENTS

| | | |
|---|---|---|
| CN | 1167380 A | 12/1997 |
| CN | 1349317 A | 5/2002 |
| JP | 04-026289 | 1/1992 |
| JP | 2000-194726 A | 7/2000 |
| JP | 2002-501681 A | 1/2002 |
| JP | 2002-123438 A | 4/2002 |
| JP | 2004-056343 | 2/2004 |
| JP | 2004-318828 A | 11/2004 |
| JP | 2006-208997 A | 8/2006 |

* cited by examiner

*Primary Examiner* — Shi K Li
(74) *Attorney, Agent, or Firm* — Wolf, Greenfield & Sacks, P.C.

(57) ABSTRACT

An optical communication apparatus is disclosed. The optical communication apparatus includes a light transmission section, a light reception section, and a control section. The light transmission section causes a light emitting portion which outputs light in a visual line direction of a user to transmit information. The light reception section causes a light receiving portion which receives light from the visual line direction of the user to receive information. The control section determines whether or not another optical communication apparatus is an information communication target based on identification information when the light reception section has optically received communication request information and the identification information from the other optical communication apparatus and causes the light transmission section to optically transmit communication response information to the other optical communication apparatus when the control section has determined that the other optical communication apparatus be the information communication target.

13 Claims, 27 Drawing Sheets

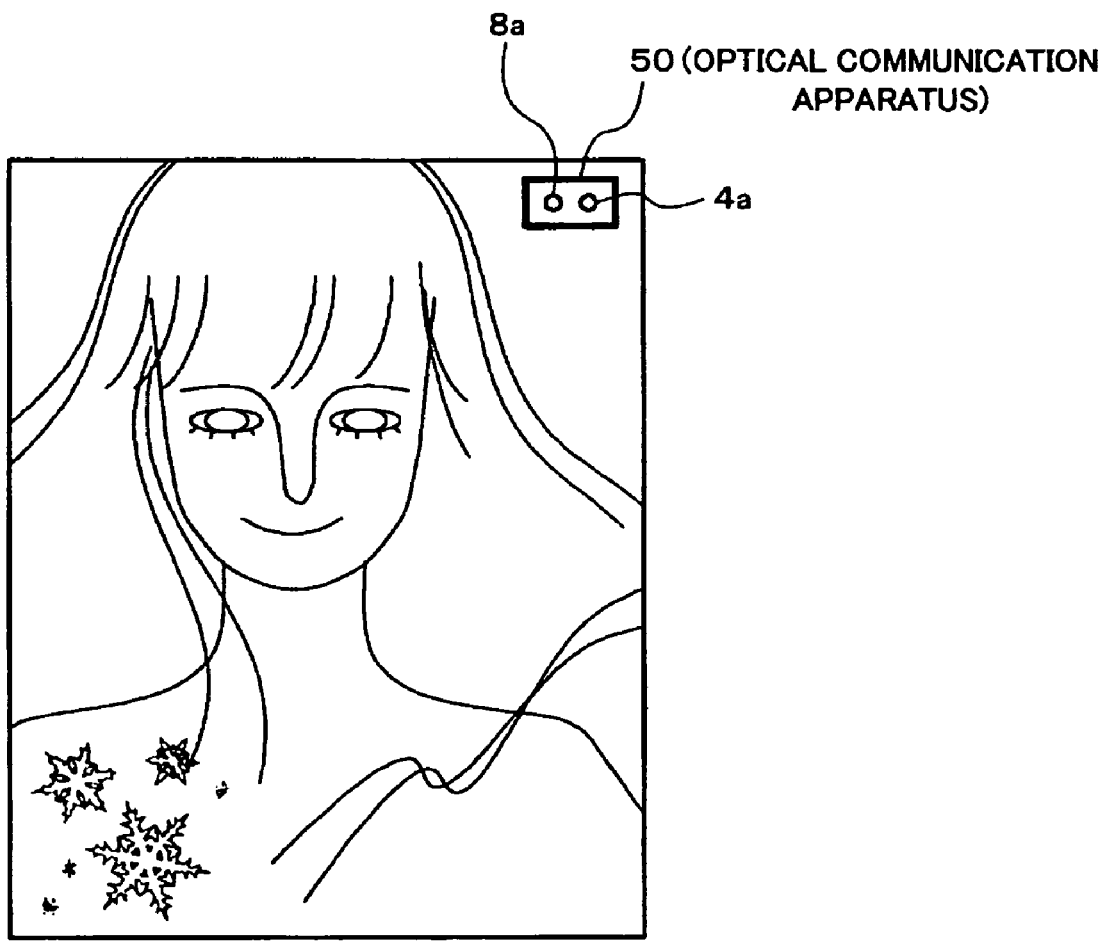

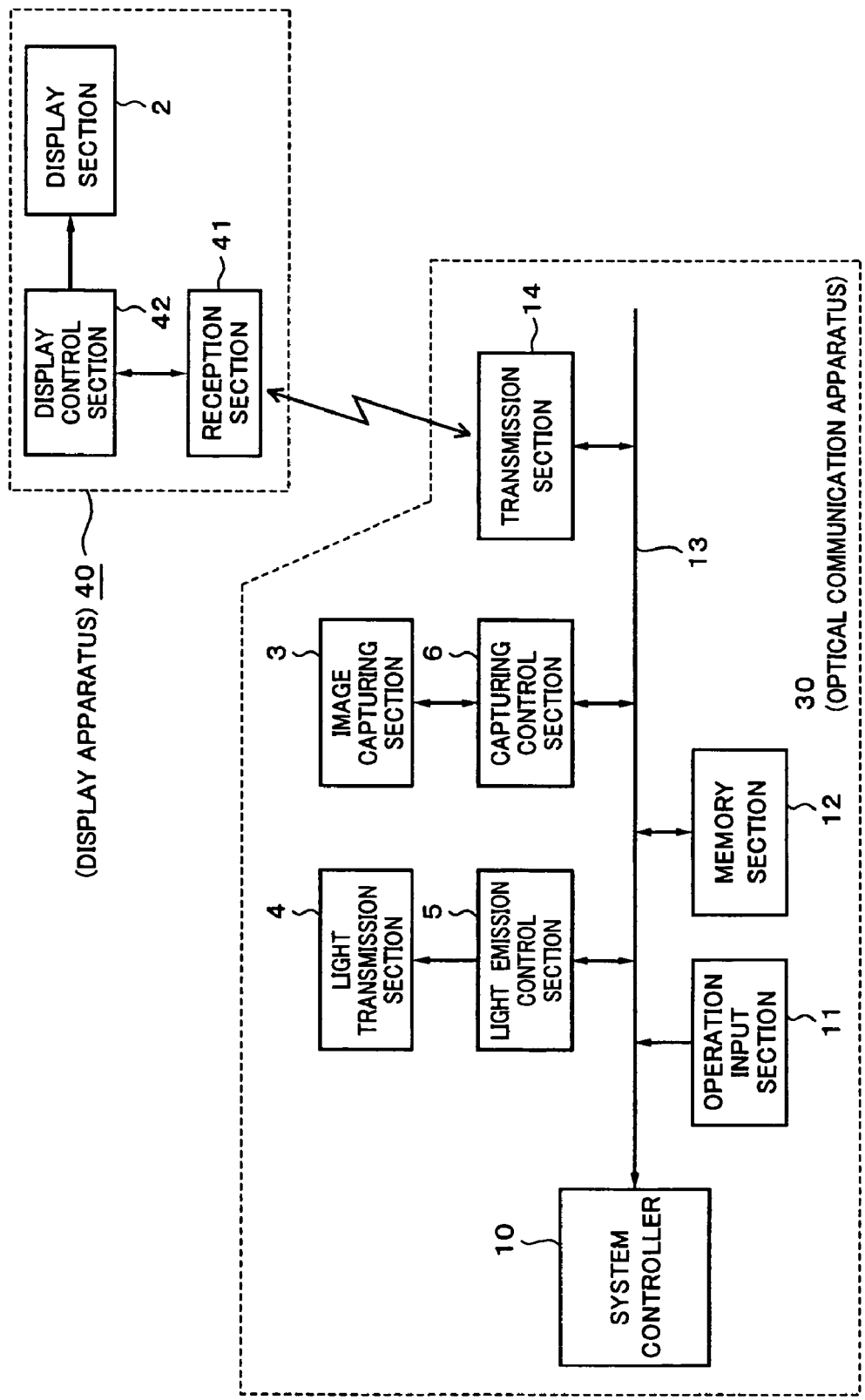

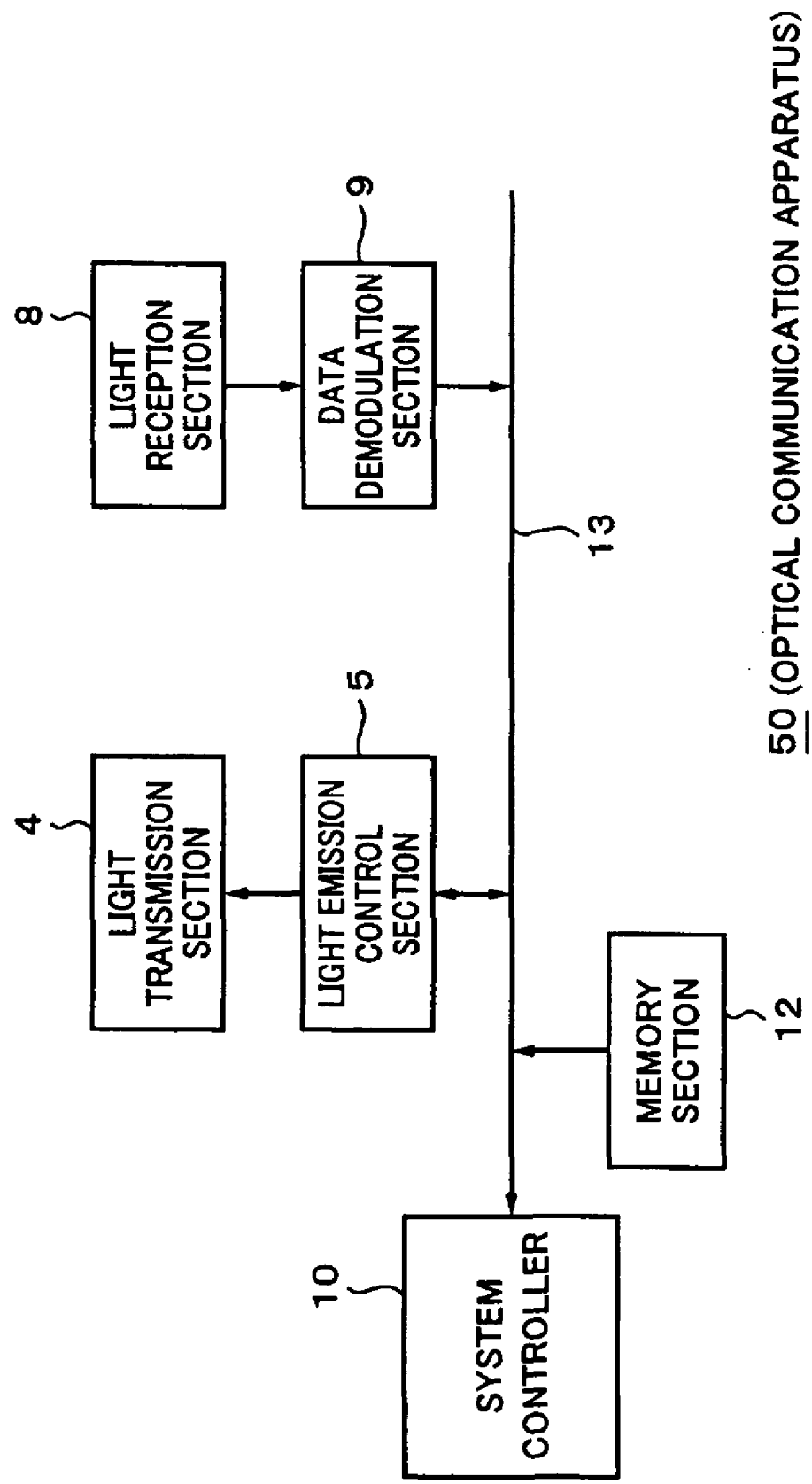

Fig. 8A COMMUNICATION MANAGEMENT TABLE
(OPTICAL COMMUNICATION DISPLAY APPARATUS OF USER A)

| | GROUP NAME | START CODE | RETURN CODE | PROVIDING DATA |
|---|---|---|---|---|
| #1 | GPN1 | STC1 | RTC1 | DTa |
| | | | | |

Fig. 8B COMMUNICATION MANAGEMENT TABLE
(OPTICAL COMMUNICATION DISPLAY APPARATUS OF USER B)

| | GROUP NAME | START CODE | RETURN CODE | PROVIDING DATA |
|---|---|---|---|---|
| #1 | GPN1 | STC1 | RTC1 | DTb |
| #2 | GPN2 | STC2 | RTC2 | DTc |
| #3 | GPN3 | STC3 | RTC3 | — |
| #4 | GPN4 | STC4 | RTC4 | DTd |
| #5 | GPN10 | STC10 | RTC10 | — |
| | | | | |

Fig. 8C COMMUNICATION MANAGEMENT TABLE
(OPTICAL COMMUNICATION APPARATUS
MOUNTED ON APPARATUS-MOUNTED OBJECT)

| GROUP NAME | START CODE | RETURN CODE | PROVIDING DATA |
|---|---|---|---|
| GPN10 | STC10 | RTC10 | DTf |

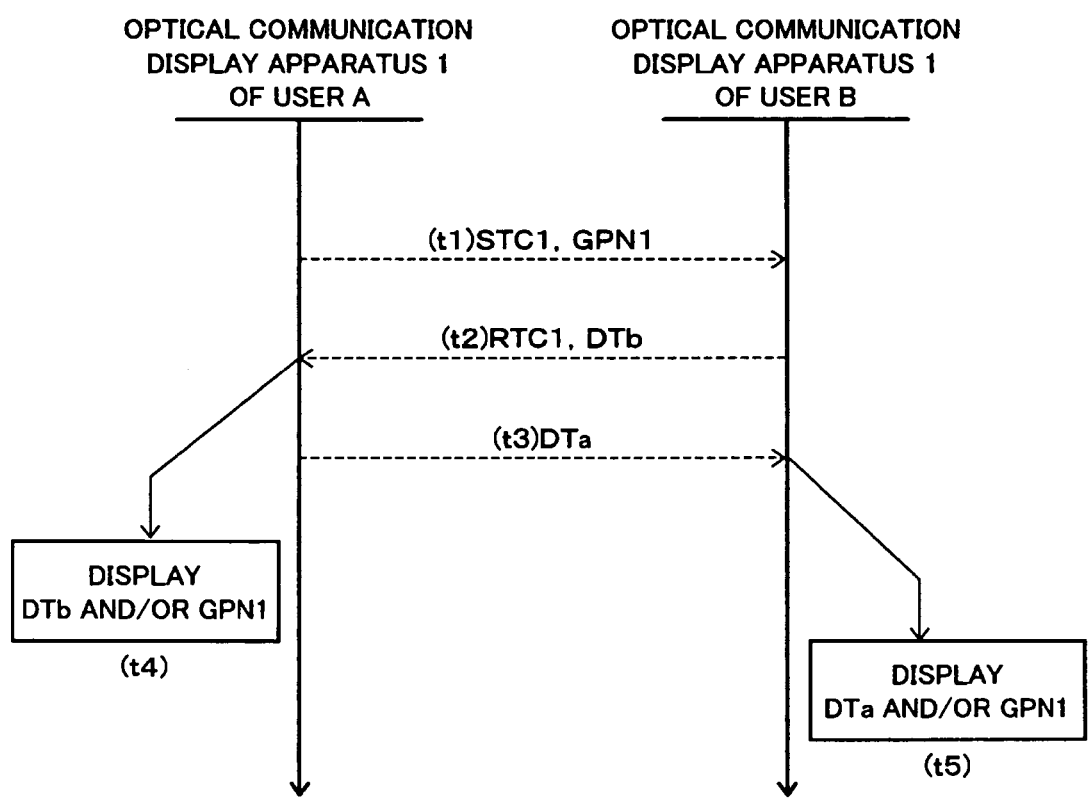

INDICATIONS DISPLAYED IN OPTICAL COMMUNICATION
DISPLAY APPARATUS 1 OF USER A

INDICATIONS DISPLAYED IN OPTICAL COMMUNICATION
DISPLAY APPARATUS 1 OF USER B

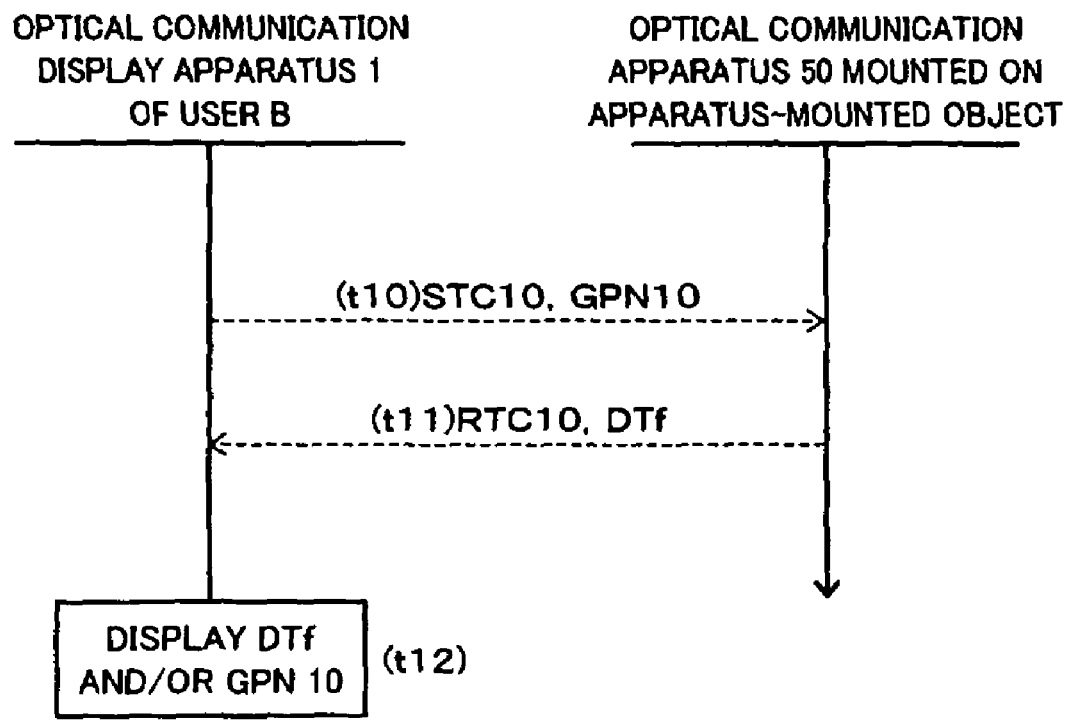

Fig. 19

COMMUNICATION MANAGEMENT TABLE

| | GROUP NAME | START CODE | RETURN CODE | PROVIDING DATA | ENCRYPTION KEY |
|---|---|---|---|---|---|
| #1 | GPN1 | STC1 | RTC1 | DTb | K1 |
| #2 | GPN2 | STC2 | RTC2 | DTc | K2 |
| #3 | GPN3 | STC3 | RTC3 | — | K3 |
| #4 | GPN4 | STC4 | RTC4 | DTd | K4 |
| #5 | GPN10 | STC10 | RTC10 | — | K5 |
| | | | | | |

Fig. 21A

LOG

| TIME STAMP | GROUP NAME |
|---|---|
| 20070315175306 | GPN2 |
| 20070315191605 | GPN1 |
| ⋮ | ⋮ |

Fig. 21B

RANKING DATA (MARCH: GROUP NAME)

| | GROUP NAME | COUNT |
|---|---|---|
| 1 | GPN8 | 1074 |
| 2 | GPN3 | 672 |
| 3 | GPN2 | 221 |
| ⋮ | ⋮ | ⋮ |

Fig. 23A

LOG

| TIME STAMP | GROUP NAME | SIGNBOARD ID |
|---|---|---|
| 20070316103159 | GPN10 | PST0003 |
| 20070316112018 | GPN1 | — |
| 20070316113125 | GPN15 | PST1273 |
| ⋮ | ⋮ | ⋮ |

Fig. 23B

RANKING DATA (MARCH: GROUP NAME)

| | GROUP NAME | COUNT |
|---|---|---|
| 1 | GPN10 | 64 |
| 2 | GPN18 | 27 |
| ⋮ | ⋮ | ⋮ |

Fig. 23C

RANKING DATA (MARCH: SIGNBOARD ID)

| | SIGNBOARD ID | COUNT |
|---|---|---|
| 1 | PST0003 | 29 |
| 2 | PST1536 | 12 |
| ⋮ | ⋮ | ⋮ |

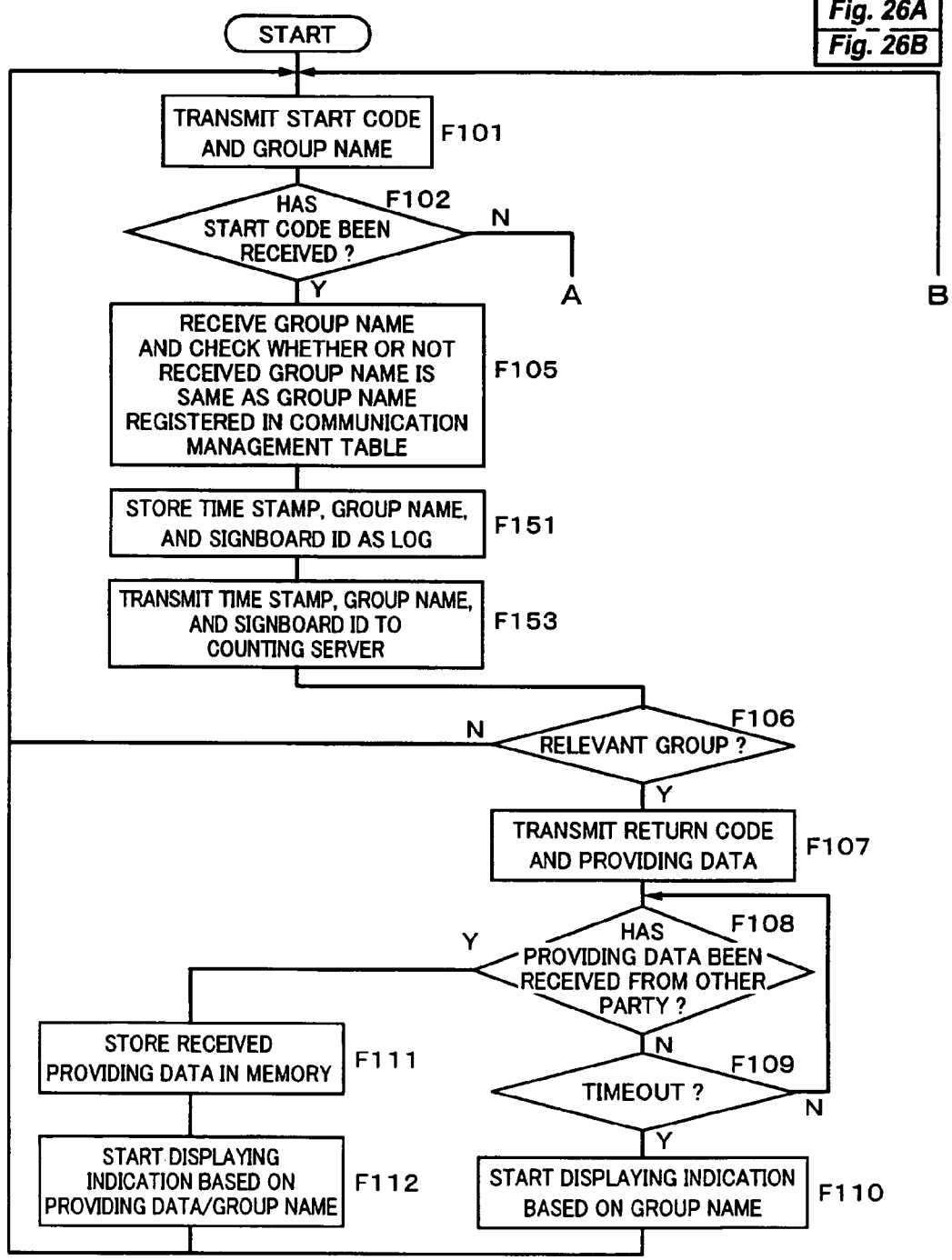

OPTICAL COMMUNICATION APPARATUS AND OPTICAL COMMUNICATION METHOD

CROSS REFERENCES TO RELATED APPLICATIONS

The present invention contains subject matter related to Japanese Patent Application No. 2007-010273 filed on Jan. 19, 2007 and Japanese Patent Application No. 2007-113964 filed on Apr. 24, 2007, the entire contents of which being incorporated herein by reference.

BACKGROUND OF THE INVENTION

1. Field of the Invention

The present invention relates to an optical communication apparatus and an optical communication method, in particular, to a technique of mutual communications between optical communication apparatus so as to exchange information therebetween.

2. Description of the Related Art

Japanese Patent Application Laid-Open No. 2004-56343, referred to as Patent Document 1, discloses a technique of communicating information with a light blinking pattern of a light emitting device such as an LED (Light Emitting Diode). Japanese Patent Application Laid-Open No. HEI 4-26289, referred to as Patent Document 2, discloses a technique of an eye-glass type image display apparatus.

SUMMARY OF THE INVENTION

Although optical communications have been used in various fields, techniques of information communications effective in the state of which persons face each other (they watch each other) and a technique of obtaining information in the state of which a person faces an object (he or she watches the object) have not yet proposed. In view of the foregoing, it would be desirable to provide an optical communication apparatus and an optical communication method of effectively performing optical communications when a user watches another person or an object.

According to an embodiment of the present invention, there is provided an optical communication apparatus. The optical communication apparatus includes a light transmission section, a light reception section, and a control section. The light transmission section causes a light emitting portion which outputs light in a visual line direction of a user to transmit information. The light reception section causes a light receiving portion which receives light from the visual line direction of the user to receive information. The control section determines whether or not another optical communication apparatus is an information communication target based on identification information when the light reception section has optically received communication request information and the identification information from the other optical communication apparatus and causes the light transmission section to optically transmit communication response information to the other optical communication apparatus when the control section has determined that the other optical communication apparatus be the information communication target.

According to an embodiment of the present invention, the optical communication apparatus also includes a storage section which stores providing information. The control section causes the light transmission section to optically transmit the providing information stored in the storage section along with the communication response information when the control section has determined that the other optical communication apparatus is the information communication target.

According to an embodiment of the present invention, the optical communication apparatus also includes a storage section which stores providing information. The control section causes the light transmission section to optically transmit the providing information stored in the storage section when the light reception section has received the communication response information optically transmitted from the other optical communication apparatus.

According to an embodiment of the present invention, the optical communication apparatus also includes a display section. The control section causes the display section to display an indication based on information transmitted from the other optical communication apparatus.

According to an embodiment of the present invention, the control section causes the display section to display an indication based on the identification information when the control section has determined that the other optical communication apparatus that has transmitted the communication request information and the identification information be an information communication target.

According to an embodiment of the present invention, the control section causes the display section to display an indication based on the identification information when the light reception section has received the communication response information optically transmitted from the other optical communication apparatus.

According to an embodiment of the present invention, the control section causes the display section to display an indication based on the providing information when the light reception section has received the providing information optically transmitted from the other optical communication apparatus.

According to an embodiment of the present invention, the display section is capable of causing all or a part of a screen area which displays an image to be a through-state which is transparent or semi-transparent.

According to an embodiment of the present invention, the control section causes the display section to display an indication based on information transmitted from the other optical communication apparatus in a vicinity of the other optical communication apparatus displayed on a display screen of the display section.

According to an embodiment of the present invention, the optical communication apparatus also includes an image capturing section which captures the visual line direction of the user as an object direction. The control section causes the light transmission section to optically transmit communication request information and own identification information to another optical communication apparatus according to an analysis result of the image capturing section.

According to an embodiment of the present invention, when the optical communication apparatus has a plurality of entries of own identification information, the control section causes the light transmission section to optically transmit communication request information and all or a selected part of the plurality of entries of own identification information.

According to an embodiment of the present invention, the optical communication apparatus also includes a storage section stores a communication management table with which at least the identification information is managed. The control section references the communication management table and determines whether or not the other optical communication apparatus is an information communication target when the light reception section has received the communication request information and the identification information optically transmitted from the other optical communication apparatus.

According to an embodiment of the present invention, the communication management table is configured to correlatively manage the identification information and the communication response information. The control section causes the light transmission section to optically transmit the communication response information correlated with the identification information on the communication management table when the control section has determined that the other optical communication apparatus be the information communication target.

According to an embodiment of the present invention, the communication management table is configured to correlatively manage the identification information and providing information. The control section causes the light transmission section to optically transmit the providing information correlated with the identification information on the communication management table when the control means has determined that the other optical communication apparatus be an information communication target.

According to an embodiment of the present invention, the identification information is information about a group. The control section determines that the other optical communication apparatus be an information communication target when the control section has recognized that the other optical communication apparatus belongs to a group which is same as a group to which the own optical communication apparatus belongs with the identification information optically transmitted from the other optical communication apparatus.

According to an embodiment of the present invention, the control section performs a process of storing the identification information as communication history information when the light reception section has received the identification information.

According to an embodiment of the present invention, the control section performs a counting process of counting the communication history information so as to generate counted data for each entry of the identification information.

According to an embodiment of the present invention, the optical communication apparatus also includes a communication section which performs a data communication with an external apparatus. The control section causes the communicating section to transmit the communication history information to an external counting server.

According to an embodiment of the present invention, there is provided an optical communication apparatus mounted on an apparatus-mounted object other than a person. The optical communication apparatus includes a light reception section, a light transmission section, a storage section, and a control section. The light reception section causes a light receiving portion which receives light in a forward direction to receive information. The light transmission section causes a light emitting portion which outputs light in the forward direction to transmit information. The storage section stores providing information. The control section determines whether or not another optical communication apparatus is an information communication target based on the identification information when the light reception section has received communication request information and identification information optically transmitted from the other optical communication apparatus which is present in the forward direction of the own optical communication apparatus and causes the light transmission section to optically transmit the providing information stored in the storage section when the control section has determined that the other optical communication apparatus be an information communication target.

According to an embodiment of the present invention, the control section performs a process of storing the identification information as communication history information when the light reception section has received the identification information.

According to an embodiment of the present invention, the control section performs a counting process of counting the communication history information so as to generate counted data for each entry of the identification information.

According to an embodiment of the present invention, the optical communication apparatus also includes a communication section which performs a data communication with an external apparatus. The control section causes the communicating section to transmit the communication history information to an external counting server.

According to an embodiment of the present invention, there is provided an optical communication method. A light receiving portion which receives light from a visual line direction of a user is caused to receive communication request information and identification information optically transmitted from another optical communication apparatus. It is determined whether or not the other optical communication apparatus is an information communication target based on the received identification information. A light emitting portion which outputs light in the visual line direction of the user is caused to optically transmit communication response information when it has been determined that the other optical communication apparatus be an information communication target.

According to an embodiment of the present invention, there is provided an optical communication method. A light receiving portion which receives light in a forward direction is caused to receive communication request information and identification information optically transmitted from another optical communication apparatus. It is determined whether or not the other optical communication apparatus is an information communication target based on the received identification information. A light emitting portion which outputs light in the forward direction is caused to optically transmit providing information which has been stored when it has been determined that the other optical communication apparatus be an information communication target.

According to embodiments of the present invention, when users who are wearing an optical communication apparatus watch each other, the optical communication apparatus perform optical communications therebetween. In addition, when a user who is wearing an optical communication apparatus watches an apparatus-mounted object on which another optical communication apparatus has been mounted, these optical communication apparatus perform optical communications therebetween. Thus, when users face each other, they can provide information therebetween. In addition, an optical communication apparatus mounted on an apparatus-mounted object rather than a person can provide information to a user who is wearing an optical communication apparatus. As a result, new information transmission systems and methods can be accomplished in a wide application range. In addition, in the state of which optical communication apparatus face each other, a first optical communication apparatus determines whether or not a second optical communication apparatus is an information communication target based on identification information. Only when the first optical communication apparatus has recognized that the second optical communication apparatus is an information communication target for example because the second optical communication apparatus belongs to the same group as that of the first optical communication apparatus, the first optical communication apparatus transmits information (for example, the first optical communication apparatus transmits providing information to the second optical communication apparatus). As a result, since information is not unconditionally transmitted, it can be provided only to adequate users.

In addition, when a person who is wearing the optical communication apparatus watches an another person who is wearing the optical communication apparatus or an apparatus-mounted object on which optical communication apparatus has been mounted, these apparatus perform optical communications therebetween. Thus, when an optical communication is performed, identification information is stored as communication history information (log) and counted for each entry of identification information. Thus, effective information that represents the number of times persons watched commercial products, signboards, and so forth can be generated.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a schematic diagram describing an optical communication apparatus according to an embodiment of the present invention, the optical communication apparatus being mounted on an apparatus-mounted object;

FIG. 6 is a block diagram showing an optical communication apparatus and a display apparatus according to an embodiment of the present invention;

FIG. 7 is a block diagram showing an optical communication apparatus according to an embodiment of the present invention, the optical communication apparatus being mounted on an apparatus-mounted object;

FIG. 8A, FIG. 8B, and FIG. 8C are schematic diagrams describing communication management tables according to an embodiment of the present invention;

FIG. 9 is a schematic diagram describing optical communications according to an embodiment of the present invention;

FIG. 12 is a schematic diagram describing optical communications according to an embodiment of the present invention;

FIG. 19 is a schematic diagram describing a communication management table used in encryption communications according to an embodiment of the present invention;

FIG. 21A and FIG. 21B are schematic diagrams describing log data and ranking data according to an embodiment of the present invention;

FIG. 23A, FIG. 23B, and FIG. 23C are schematic diagrams describing log data and ranking data according to an embodiment of the present invention;

DETAILED DESCRIPTION OF THE PREFERRED EMBODIMENTS

Next, an optical communication apparatus and a communication method according to embodiments of the present invention will be described. In these embodiments, an optical communication display apparatus 1 and an optical communication apparatus 30 that a user wears, and an optical communication apparatus 50 mounted on an apparatus-mounted object other than a person correspond to an optical communication apparatus as set in claims of the present application. In addition, as processes of the optical communication display apparatus 1, the optical communication apparatus 30, and the optical communication apparatus 50, optical communication methods of embodiments of the present invention are performed. In addition, the optical communication display apparatus 1, the optical communication apparatus 30, and the optical communication apparatus 50 may be another optical communication apparatus as set forth in claims of the present application.

Embodiments of the present invention will be described in the following order.

[1. Examples of appearances of optical communication display apparatus, optical communication apparatus, and display apparatus]

[2. Examples of structures of optical communication display apparatus, optical communication apparatus, and display apparatus]

[3. Communication management tables and communications]

[4. Example of process of optical communication display apparatus]

[5. Example of process of optical communication apparatus mounted on apparatus-mounted object]

[6. Effects of embodiments and modification and extension of embodiments]

[7. Another extension of embodiment (counting based on communication log)]

[1. Examples of Appearances of Optical Communication Display Apparatus, Optical Communication Apparatus, and Display Apparatus]

Figure 1:
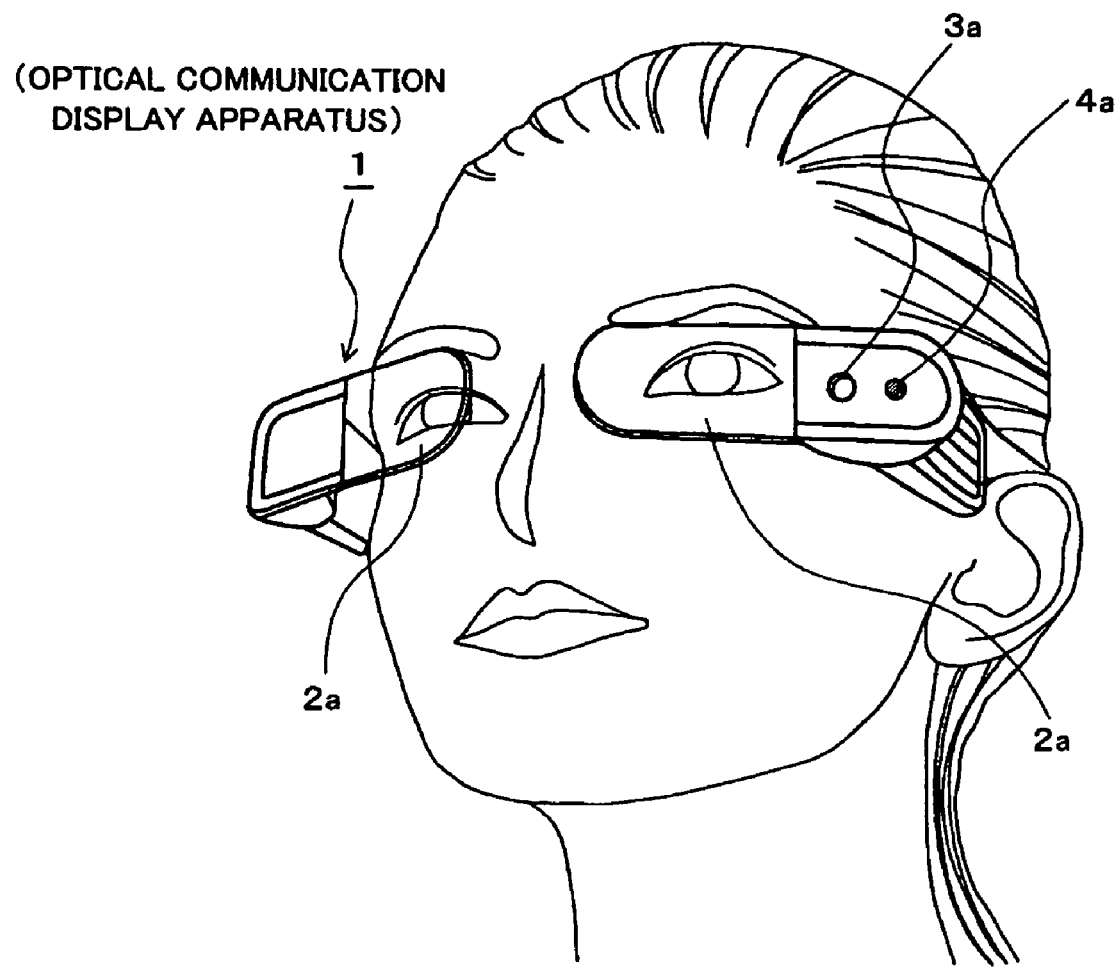
FIG. 1 is an external view describing an optical communication display apparatus according to an embodiment of the present invention.

FIG. 1 shows an example of an appearance of the optical communication display apparatus 1 according to an embodiment of the present invention. The optical communication display apparatus 1 is an eye-glass type display camera that the user can wear. The optical communication display apparatus 1 has a frame type mounting unit that surrounds from both the head side portions to the head rear portion. As shown in FIG. 1, by placing the mounting unit on his or her both conchae, he or she can wear the optical communication display apparatus 1. In the mounted state shown in FIG. 1, a pair of display panel portions 2a for the left eye and the right eye are disposed immediately in front of both the eyes of the user, namely at the positions of lenses of regular eye-glasses. The display panel portions 2a are composed of for example liquid crystal panels. By controlling the transmissivity of the liquid crystal panels, the display panel portions 2a become a through-state shown in FIG. 1, namely a transparent state or a semi-transparent state. Since the display panel portions 2a become the through-state, even if the user is regularly wearing the optical communication display apparatus 1 like eye glasses, the optical communication display apparatus 1 does not adversely affect his or her normal life.

When the user wears the optical communication display apparatus 1, an image capturing lens 3a faces forward such that an image is captured in the visual line direction of the user, namely the direction of the object. In this example, an image capturing section 3 (shown in FIG. 5 and so forth) that includes the image capturing lens 3a functions as a light reception means that receives information optically transmitted from another optical communication display apparatus 1, another optical communication apparatus 30, or another optical communication apparatus 50 in addition to capturing a scene in the visual line direction of the user.

A light emitting section 4a that emits light in the visual line direction of the user who wears the optical communication display apparatus 1 is composed of for example an LED (Light Emitting Diode). In this example, a light transmission section 4 (shown in FIG. 5 and so forth) including the light emitting section 4a functions a light transmission means that optically transmits information to another optical communication display apparatus 1, another optical communication apparatus 30, or another optical communication apparatus 50 in the visual line direction of the user.

FIG. 1 is just an example of a structure of the optical communication display apparatus 1. Thus, various types of structures of which the optical communication display apparatus 1 that the user wears can be contemplated. The optical communication display apparatus 1 may have any structure as long as the mounting unit is of regular eye-glass type or head mounting type, the display panel portions 2a are disposed in front of the eyes of the user, and the image capturing direction of the image capturing lens 3a and the light output direction of the light emitting section are the visual line direction of the user, namely the forward direction of the user. In the foregoing example, the optical communication display apparatus 1 has a mounting unit of eye-glass type or head mounting type. Instead, the mounting unit may be of any type, for example, headset type, neckband type, ear hanging type, or the like. Instead, the mounting unit may be mounted to regular eye-glasses, a regular visor, or a regular headset with a mounting tool such as a clip. Instead of the display panel portions 2a corresponding to both the eyes of the user, the display panel portions 2a may correspond to the eyes of the user. In addition, the mounting unit may have one or two earphone speakers that are inserted into one or both ear holes of the user who wears the mounting unit. In addition, the mounting unit may have a microphone that collects external sound.

The optical communication display apparatus 1 shown in FIG. 1 is an apparatus of which an optical communication section and the display panel portions 2a, which monitor an image, are integrally formed and that the user wears. As an apparatus that the user wears, the optical communication apparatus 30 and a display apparatus 40 shown in FIG. 2A and FIG. 2B, respectively can be contemplated.

Figure 2A:
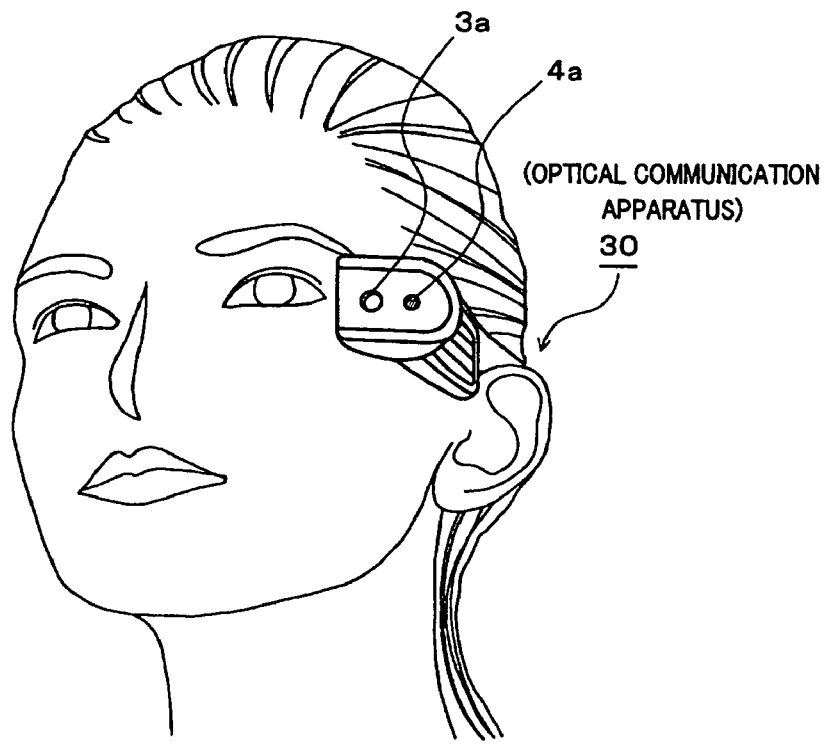
FIG. 2A is an external view describing an optical communication apparatus according to an embodiment of the present invention.

The optical communication apparatus 30 shown in FIG. 2A is mounted at both head side portions of the user with the predetermined mounting frame. The image capturing lens 3a and the light emitting section 4a are disposed in the forward direction such that a target is captured in the direction of the object that is the visual line direction of the user who wears the optical communication apparatus 30. In other words, although the optical communication apparatus 30 does not have a display function, the image capturing lens 3a faces forward such that image capturing lens 3a captures an image in the direction of the object that is the visual line direction of the user who wears the optical communication apparatus 30 and receives optical transmission information in the visual line direction of the user.

In addition, the optical communication apparatus 30 has the light emitting section 4a that emits light in the visual line direction of the user who wears the optical communication apparatus 30 and transmits information. Like the optical communication display apparatus 1, it can be contemplated that the optical communication apparatus 30 is structured in various shapes and mounting structures and using various structural elements.

Figure 2B:
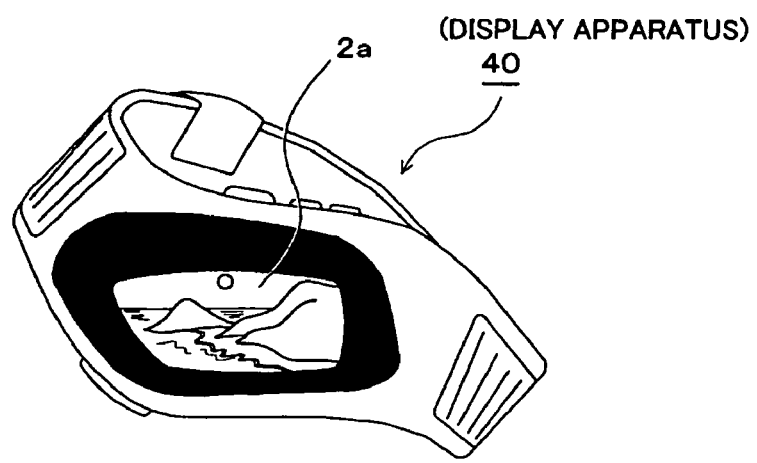
FIG. 2B is an external view describing a display apparatus according to an embodiment of the present invention.

The display apparatus 40 shown in FIG. 2B is a wrist-watch type display apparatus. Disposed in the display apparatus 40 is a display panel section 2a that the user who is wearing on his or her wrist can watch.

In FIG. 2B, the display apparatus 40 is of wrist watch type. It can be contemplated that the display apparatus 40 that the user wears or has is formed in various forms and mounting structures. The display apparatus 40 may be, for example, of portable and small type. When the display apparatus 40 is a portable apparatus, it may be a mobile phone, a portable game machine, a PDA (Personal Digital Assistant), or the like that has a display function as well a dedicated apparatus having only a display function.

Although the optical communication apparatus 30 and the display apparatus 40, respectively, shown in FIG. 2A and FIG. 2B may be independently used, it can be contemplated that the user wears both the optical communication apparatus 30 and the display apparatus 40 as an optical communication display apparatus composed of them. For example, the optical communication apparatus 30 and the display apparatus 40 communicate data therebetween and the display apparatus 40 monitors an image captured by the optical communication apparatus 30 and displays received information.

Although it is assumed that the optical communication display apparatus 1, the optical communication apparatus 30, and the display apparatus 40, respectively, shown in FIG. 1, FIG. 2A, and FIG. 2B are used by the user (person), an optical communication apparatus 50 mounted on an apparatus-mounted object rather than a person can be contemplated. It can be contemplated that examples of an apparatus-mounted object other than a person (hereinafter simply referred to as an apparatus-mounted object) include stationary objects such as posters, signboards, guide plates for various types of facilities, walls of buildings, doors, windows, and trees, moving objects such as cars and railroad trains, commercial products in stores, and animals such as dogs and cats. FIG. 3 shows an example of which the optical communication apparatus 50 is mounted on a poster as an apparatus-mounted object. The optical communication apparatus 50 has a light receiving section 8*a* and the light emitting section 4*a* that face forward. When the user who is wearing for example the optical communication display apparatus 1 shown in FIG. 1 or the optical communication apparatus 30 shown in FIG. 2A turns his or her eyes on the apparatus-mounted object, the light receiving section 8*a* receives information optically transmitted from the optical communication display apparatus 1 (or the optical communication apparatus 30). In addition, the optical communication display apparatus 1 (or the optical communication apparatus 30) receives information optically transmitted from the light emitting section 4*a*.

Figure 4A:
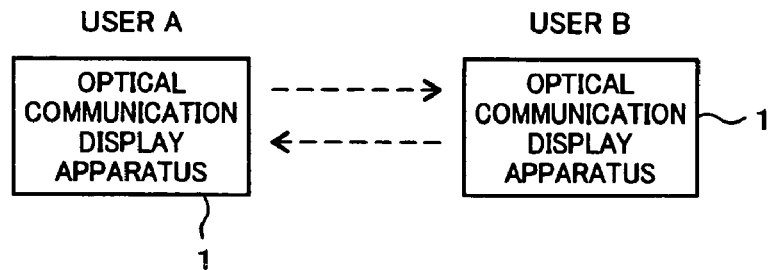
FIG. 4A, FIG. 4B, and FIG. 4C are schematic diagrams describing optical communication operations performed between apparatus according to an embodiment of the present invention.
Figure 4B:
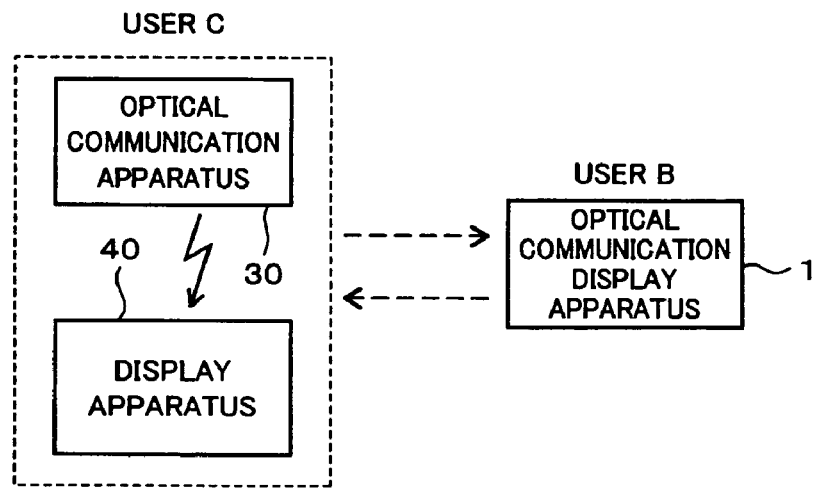
Figure 4C:
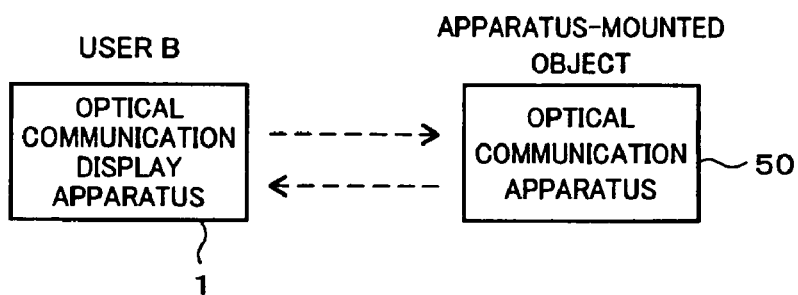

The optical communication display apparatus 1, the optical communication apparatus 30, and the optical communication apparatus 50, respectively, shown in FIG. 1, FIG. 2A, and FIG. 3 perform optical communications therebetween when they face each other. FIG. 4A, FIG. 4*b*, and FIG. 4C show examples of communication modes. FIG. 4A shows the case of which user A and user B are each wearing the optical communication display apparatus 1 shown in FIG. 1. When user A turns his or her eyes on user B or user B turns his or her eyes on user A, in other words, when their eyes meet, the image capturing lens 3*a* of the optical communication display apparatus 1 of user B can capture (receive) light emitted from the light emitting section 4*a* of the optical communication display apparatus 1 of user A. In addition, the image capturing lens 3*a* of the optical communication display apparatus 1 of user A can capture (receive) light emitted from the light emitting section 4*a* of the optical communication display apparatus 1 of user B. In this state, these optical communication display apparatus 1 perform optical communications therebetween.

FIG. 4B shows the state of which user C who is wearing the optical communication apparatus 30 and the display apparatus 40, respectively, shown in FIG. 2A and FIG. 2B performs optical communications with user B who is wearing the optical communication display apparatus 1 shown in FIG. 1. As in the case shown in FIG. 4A, when the eyes of user B meet the eyes of user C, the image capturing lens 3*a* of the optical communication apparatus 30 of user C captures (receives) light emitted from the light emitting section 4*a* of the optical communication display apparatus 1 of user B. In addition, the image capturing lens 3*a* of the optical communication display apparatus 1 of user B captures (receives) light emitted from the light emitting section 4*a* of the optical communication display apparatus 1 of user C. As a result, they can perform optical communication therebetween. When the eyes of users who are each wearing the optical communication apparatus 30 shown in FIG. 2A meet, they perform optical communications therebetween (not shown in FIG. 4B).

FIG. 4C shows the state of which when user B who is wearing the optical communication display apparatus 1 shown in FIG. 1 watches an apparatus-mounted object on which the optical communication apparatus 50 has been mounted as shown in FIG. 3, the optical communication display apparatus 1 and the optical communication apparatus 50 performs optical communications therebetween.

The optical communications shown in FIG. 4A, FIG. 4B, and FIG. 4C are performed in such a manner that the transmission side transmits data in a light blinking pattern emitted from the light emitting section 4*a*. In other words, the light emitting section 4*a* brinks light in a modulation pattern with data to be transmitted. On the reception side, the image capturing section 3 (that will be described later) including the image capturing lens 3*a* recognizes an emitted light pattern and demodulates received data. In these optical communications, although visible light may used, light having wavelengths other than the visible light range, for example infrared light, may be used.

[2. Examples of Structures of Optical Communication Display Apparatus, Optical Communication Apparatus, and Display Apparatus]

Figure 5:
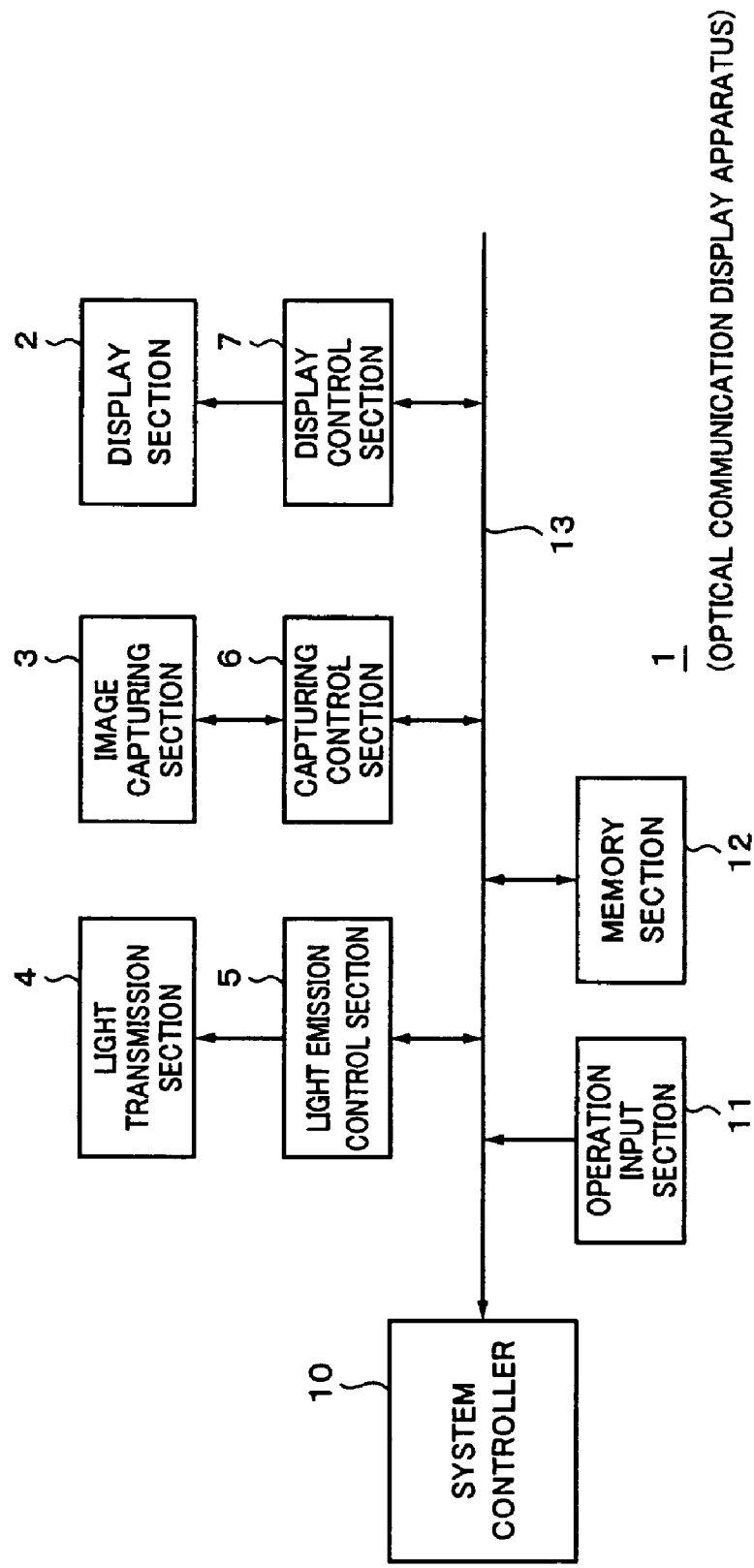
FIG. 5 is a block diagram showing an optical communication display apparatus according to an embodiment of the present invention.

Next, with reference to FIG. 5 to FIG. 7, examples of structures of the optical communication display apparatus 1, the optical communication apparatus 30, the display apparatus 40, and the optical communication apparatus 50 will be described. FIG. 5 shows an example of a structure of the optical communication display apparatus 1 shown in FIG. 1.

A system controller 10 is composed of a microcomputer having, for example, a CPU (Central Processing Unit), a ROM (Read Only Memory), a RAM (Random Access Memory), a nonvolatile memory section, and an interface section. The system controller 10 is a control section that controls the entire optical communication display apparatus 1. The system controller 10 performs various types of arithmetic processes and exchanges control signals and so forth with each section through a bus 13 based on a program stored in an internal ROM or the like and causes each section to execute a predetermined operation.

The optical communication display apparatus 1 has an image capturing section 3 as a structure that captures a scene in the visual line direction of the user and receives data optically transmitted from another optical communication apparatus placed in the visual line direction of the user. Another optical communication apparatus is one of the optical communication display apparatus 1, the optical communication apparatus 30, and the optical communication apparatus 50. Hereinafter, the term "another (other) optical communication apparatus" refers to one of another optical communication display apparatus 1, another optical communication apparatus 30, and another optical communication apparatus 50 that can function as other communication party.

The image capturing section 3 has an image capturing optical system, an image capturing element section, and a captured image signal processing section. The image capturing optical system of the image capturing section 3 include a lens system composed of the image capturing lens 3a shown in FIG. 1, a diaphragm, a zoom lens, a focus lens, and so forth, and a drive system that causes the lens system to perform a focus operation and a zoom operation. The image capturing element section of the image capturing section 3 has a solid state image capturing element array that detects captured light obtained by the image capturing optical system, converts the captured light into electricity, and generates a captured image signal. The solid state image capturing element array is for example a CCD (Charge Coupled Device) sensor array or a CMOS (Complementary Metal Oxide Semiconductor) sensor array. The captured image signal processing section of the image capturing section 3 includes a sample hold/AGC (Automatic Gain Control) circuit that adjusts the gain of a signal obtained by the solid state image capturing element array and trims the waveform of the signal and a video A/D converter. The captured image signal processing section obtains captured image data as digital data. In addition, the captured image signal processing section performs a white balance process, a luminance process, a color signal process, a hand jitter correction process, and so forth for the captured image data.

The image capturing section 3 that has these image capturing optical system, the image capturing element section, and the captured image signal processing section captures an image and obtains captured image data. In addition, the image capturing section 3 receives data optically transmitted from another optical communication apparatus. When optical communications are performed, for example, with infrared light, the image capturing element section and the captured image signal processing section are structured to process the infrared region as well as the visible region.

The image data obtained by the image capturing operation of the image capturing section 3 are processed by a capturing control section 6. The capturing control section 6 performs a process of converting captured image data into a predetermined image data format and predetermined signal processes of displaying an image on a display section 2 under the control of the system controller 10. The signal processes of displaying an image on the display section 2 include for example luminance level adjustment, color correction, contrast adjustment, sharpness (contour emphasis) adjustment, screen division process, combining process for character images, generation of enlarged or reduced image, image effect processes of mosaic image/luminance inversion image/ soft focus/partially emphasized indication of image/change of atmosphere of colors of entire image. The capturing control section 6 performs on/off controls of the image capturing operation of the image capturing section 3, drive controls of zoom lens and focus lens of the image capturing optical system, controls of sensitivity and frame rate of the image capturing element section, settings of parameters of each process of the captured image signal processing section, and so forth under the control of the system controller 10. The capturing control section 6 supplies captured image data to a memory section 12 that stores captured image data and to a display control section 7 that displays the captured image data on the display section 2 under the control of the system controller 10. When the captured image data are supplied to the memory section 12, the capturing control section 6 performs an encoding process such that image data can be recorded.

The capturing control section 6 analyzes the captured image data and detects an emitted light pattern transmitted from another optical communication apparatus. When the capturing control section 6 detects an emitted light pattern optically transmitted from the other optical communication apparatus, the capturing control section 6 analyzes the emitted light pattern and demodulates it as received data. The capturing control section 6 supplies the received data to the system controller 10 and the memory section 12 that stores the received data.

As a structure that displays data for the user, the optical communication display apparatus 1 has the display section 2 and the display control section 7. The display section 2 has the display panel portions 2a, composed of the foregoing liquid crystal panel or the like, and a display drive section that drives the display panel portions 2a to display data. The display drive section is composed of a pixel drive circuit that causes the display panel portions 2a that are for example liquid crystal displays to display an image signal supplied from the capturing control section 6 and data obtained through optical communications. The pixel drive circuit applies a drive signal to each pixel arranged in a matrix shape in the display panel portions 2a based on an image signal at a predetermined horizontal/vertical drive timing and causes the display panel portions 2a to display an image.

The display control section 7 drives the pixel drive circuit of the display section 2 to cause the display panel portions 2a to display a predetermined indication under the control of the system controller 10. In other words, the display control section 7 causes the display panel portions 2a to display an image as a monitor of the image capturing section 3, a reproduced image of captured image data stored in the memory section 12, and data received by optical communications. In addition, the display control section 7 causes the display drive section to control the transmissivity of each pixel under the control of the system controller 10 such that the display panel portions 2a becomes the through-state (a transparent state or a semitransparent state). The display control section 7 performs on/off (through) controls of the display operation of the display section 2, setting of process parameters for image data to be displayed, image area setting control, character generation, and so forth under the control of the system controller 10.

The memory section 12 is used to store various types of data. For example, the memory section 12 stores captured image data, received data through optical communications, and communication management tables (that will be described later). The memory section 12 may be composed of a solid state memory such as a RAM or a flash memory. Instead, the memory section 12 may be composed of a HDD (Hard Disk Drive). Of course, the memory section 12 may be a memory card having a built-in solid state memory, a recording and reproducing drive for a record medium such as an optical disc, an optical magnetic disc, or a hologram memory. The memory section 12 may be the RAM or nonvolatile memory of the system controller 10 instead of an independent memory. The memory section 12 records image data that have been captured and received through optical communications under the control of the system controller 10. In addition, the memory section 12 reads recorded data under the control of the system controller 10 and supplies them to the system controller 10, the display control section 7, and so forth.

In addition, the optical communication display apparatus 1 has a light transmission section 4 and a light emission control section 5. The light transmission section 4 is composed of the light emitting section 4a shown in FIG. 1 and FIG. 2A and a light emitting circuit that causes the light emitting section 4a (for example, an LED) to emit light. The light emission control section 5 causes the light transmission section 4 to emit light under the control of the system controller 10. In other words, when data to be transmitted to another optical communication apparatus are supplied from the system controller 10 to the light emission control section 5, it modulates the data and causes the light emitting section 4a of the light transmission section 4 to emit light in a light blinking pattern based on the modulated data. The system controller 10 causes the light transmission section 4 to regularly transmit communication request information and identification information stored in a communication management table (that will be described later). When the optical communication display apparatus 1 communicates with another optical communication apparatus, the system controller 10 causes the light transmission section 4 to transmit communication response information and providing data stored in the communication management table. The light emitting section 4a (for example, an LED) of the light transmission section 4 may emit visible light or infrared light when optical communications are performed with invisible light such as infrared light. When optical communications are performed with invisible light, the light emitting section 4a is composed of for example an LED that emits infrared light.

The optical communication display apparatus 1 has an operation input section 11 with which the user operates the optical communication display apparatus 1. The operation input section 11 may have for example operation switches such as keys and dials and detect user' operations for keys and so forth or user's intentional actions. When the operation input section 11 has operation switches, they may be for power on/off operations, operations for the image capturing system (for example, zoom operation and command operations for signal processes), display related operations (for example, display menu selection and display adjustment operation), and so forth.

When the operation input section 11 detects user's actions, it can be contemplated that the operation input section 11 has an acceleration sensor, an angular velocity sensor, a vibration sensor, a pressure sensor, and so forth. When the user taps a side surface of the optical communication display apparatus 1, the acceleration sensor, the vibration sensor, and so forth detect the user's action. It can be contemplated that when the lateral acceleration exceeds a predetermined level, the system controller 10 recognizes it as a user's operation. If the optical communication display apparatus 1 can detect whether the user has tapped a right portion (corresponding to the bow of eye glasses) or a left portion of the optical communication display apparatus 1 with the acceleration sensor and the angular velocity sensor, the system controller 10 can determine that these actions be predetermined operations. If the acceleration sensor and the angular velocity sensor detect user's actions of which he or she has turned his or her head or has shaken his or her head sideway, the system controller 10 can recognize them as his or her operations. In the case that pressure sensors are disposed at the left and right portions (corresponding to the bows of eye glasses) and so forth of the optical communication display apparatus 1, if the user presses the right portion with his or her finger, the optical communication display apparatus 1 may perform a telescopic zoom operation. In this case, if the user presses the left portion with his or her finger, the optical communication display apparatus 1 may perform a wide angle zoom operation.

The operation input section 11 may have a biosensor. When the biosensor detects bioinformation, the optical communication display apparatus 1 may recognize it as an operation input. Examples of bioinformation include pulse rate, heart rate, electrocardiogram information, electromyography, respiratory information (for example, breathing rate, breathing depth, breathing capacity, and so forth), perspiration, GSR (Galvanic Skin Response), blood pressure, blood oxygen saturation concentration, skin surface temperature, brain waves (for example, information about $\alpha$ waves, $\beta$ waves, $\theta$ waves, and $\delta$ waves), blood flow change, and eye conditions. The system controller 10 may recognize information detected by the biosensor as an user's operation input. As user's intentional actions, the motions of eyes (change of visual line direction and blinking) can be contemplated. When the user blinks his or her eyes three times, the system controller 10 may recognize it as a predetermined operation input. In addition, when the system controller 10 uses the foregoing bioinformation, the system controller 10 may detect that the user has put on or off the optical communication display apparatus 1 and that a predetermined user has put on the optical communication display apparatus 1. When the system controller 10 detects such bioinformation, the system controller 10 may turn on/off the power of the optical communication display apparatus 1.

The operation input section 11 supplies information obtained from the operation switches, acceleration sensor, angular velocity sensor, vibration sensor, pressure sensor, biosensor, and so forth to the system controller 10. The system controller 10 detects a user's operation based on these types of information.

Next, examples of structures of the optical communication apparatus 30 and the display apparatus 40 will be described. As shown in FIG. 4B, as the apparatus that user C has, both the optical communication apparatus 30 and the display apparatus 40, respectively, shown in FIG. 2A and FIG. 2B may have the same function as that of the optical communication display apparatus 1. In this case, it can be contemplated that the optical communication apparatus 30 and the display apparatus 40 have, for example, structures shown in FIG. 6. For simplicity, in FIG. 6, same sections as those shown in FIG. 5 are designated by the same reference numerals and their description will be omitted. In the example shown in FIG. 6, the optical communication apparatus 30 has nearly the same structure as that of the optical communication display apparatus 1 shown in FIG. 5. However, the optical communication apparatus 30 does not have a display section 2 and a display control section 7. Instead, the optical communication apparatus 30 has a transmission section 14. The transmission section 14 encodes image data supplied from the capturing control section 6 and the memory section 12, indication data (or command data of indication characters) based on received data through optical communications, control signals supplied from the system controller 10, and so forth and transmits the encoded data to the display apparatus 40.

The display apparatus 40 has a reception section 41, a display control section 42, and a display section 2. The reception section 41 performs data communications with a transmission section 21 of the optical communication apparatus 30. The reception section 41 receives data (indication image data and control data) transmitted from the optical communication apparatus 30 and decodes the received data. The decoded data are supplied from the reception section 41 to the display control section 42. The display control section 42 performs processes including an indication signal process, a screen division process, and a character combining process, generates an indication image signal, and supplies the indication image signal to the display section 2 having a display panel 2a that is for example a liquid crystal display. The display section 2 applies a drive signal to each pixel of the display panel portion 2a arranged in a matrix shape based on the indication image signal at a predetermined horizontal/vertical drive timing and causes the display panel portion 2a to display an image.

Thus, the user who is wearing the optical communication apparatus 30 and the display apparatus 40 as in user C shown in FIG. 4B can use them in the same manner as the optical communication display apparatus 1. The optical communication apparatus 30 and the display apparatus 40 may perform communicates using a near distance wireless communication system, for example, wireless LAN or Bluetooth.

FIG. 7 shows an example of a structure of the optical communication apparatus 50, shown in FIG. 3, mounted on an apparatus-mounted object other than a person. Since the optical communication apparatus 50 is not an apparatus that a person wears, a structural portion with respect to the user interface is omitted. In other words, the display section 2, the display control section 7, and the operation input section 11 are omitted from the structure shown in FIG. 5. Instead of the image capturing section 3 and the capturing control section 6 shown in FIG. 5, the optical communication apparatus 50 has a light reception section 8 and a data demodulation section 9. The light reception section 8 has a light receiving portion composed of for example a phototransistor, a simply structured image capturing element array, or the like. The light reception section 8 receives transmission light from another optical communication apparatus. The data demodulation section 9 demodulates the received light signal as received data. The received data are supplied to a system controller 10 and then stored in a memory section 12.

The optical communication display apparatus 1 shown in FIG. 5 and the optical communication apparatus 30 shown in FIG. 6 that are apparatuses that the user wears have the image capturing section 3 that has a function of capturing an image in the visual line direction of the user as a light reception means for optical communications. When the optical communication apparatus 50 performs only optical communications rather than an image capturing function for an image in the visual line direction of the user, as shown in FIG. 7, instead of the image capturing section 3, the optical communication apparatus 50 may have the light reception section 8, which has a light receiving portion composed of a phototransistor, a simply structured image capturing element, or the like, and the data demodulation section 9 that demodulates received light of the light reception section 8 as received data.

In the foregoing, the structures of the optical communication display apparatus 1, the optical communication apparatus 30, the display apparatus 40, and the optical communication apparatus 50 have been described. However, they are just examples. Of course, various structural elements may be added to and/or deleted from these apparatus depending on an operation and a function of the system that is actually embodied.

[3. Communication Management Tables and Communications]

Next, optical communications performed by the optical communication display apparatus 1 and the optical communication apparatus 30 and 50 will be described. First of all, a communication management table that is stored in the memory section 12 of each of the optical communication display apparatus 1 and the optical communication apparatus 30 and 50 will be described.

FIG. 8A and FIG. 8B show examples of communication management tables that the optical communication display apparatus 1 and the optical communication apparatus 30 have. A communication management table is a table that correlatively stores group names as identification information, start codes as communication request information, return codes as communication response information, and providing data as various types of data provided to other communication party. Providing data may be stored as real data in the communication management table. Instead, providing data may be link information such as another file data stored in a communication management table.

The communication management table can have one or a plurality of entries that are registered. For example, the user selects a group to which he or she belongs (he or she creates a group together with his or her friends or the like) and registers himself or herself thereto. Providing data may be data that the user has freely created or edited.

FIG. 8A shows a communication management table stored in the optical communication display apparatus 1 that for example user A has. FIG. 8B shows a communication management table stored in the optical communication display apparatus 1 that for example user B has. It is assumed that user A belongs to a group having group name GPN1 and user B belongs to five groups having group names GPN1, GPN2, GPN3, GPN4, and GPN10. In other words, user A has registered one group to his or her optical communication display apparatus 1. In contrast, user B has registered five groups to his or her optical communication display apparatus 1.

In this case, group name GPN1 has been registered as entry #1 in the communication management table stored in the optical communication display apparatus 1 that user A has. In addition, start code STC1 and return code RTC1 have been registered such that they have been correlated with group name GPN. In addition, data DTa of user A provided to other persons who belong to the same group have been correlated.

Group names GPN1, GPN2, GPN3, GPN4, and GPN10 have been registered as entries #1 to #5, respectively, in the communication management table stored in the optical communication display apparatus 1 that user B has. Start code STC1 and return code RTC1 have been registered such that they have been correlated with group name GPN1. In addition, data DTb of user B provided to other persons of the same group have been correlated. Likewise, with respect to group names GPN2, GPN3, GPN4, and GPN10, start codes, return codes, and providing data have been correlated. However, each user can freely correlate any providing data to any group name. For example, user B has not correlated providing data to group name GPN3 of entry #3. In this case, user B does not want to provide any information to other persons who belong to group name GPN3. In this example, group name GPN10 as entry #5 is a group name for a particular information service and the optical communication apparatus of a person who belongs to this group communicates with the optical communication apparatus 50 mounted on the apparatus-mounted object. In this case, it can be contemplated that providing data have not been registered. Of course, providing data may be registered. When the user receives an information service, he or she may provide information to the optical communication apparatus 50.

As is clear from FIG. 8A and FIG. 8B, predetermined start code and return code have been registered for each group. For example, for group name GPN1, start code STC1 and return code RTC1 have been registered. For group name GPN2, start code STC2 and return code RTC2 have been registered.

As shown in FIG. 4A, when the optical communication display apparatus 1 of user A performs optical communications with the optical communication display apparatus 1 of user B, their group names are the same, GPN1. When they perform optical communications, start code STC1 and return code RTC1 are used. FIG. 9 shows basic communications performed between the optical communication display apparatus 1 of user A and user B. In both the optical communication display apparatus 1, their light transmission sections 4 regularly transmit start code STC1 and group name GPN1 to each other. Since the number of entries registered in the communication management table of the optical communication display apparatus 1 of user A is one, the light transmission section 4 regularly transmits start code STC1 and group name GPN1 at intervals of one second or several seconds. On the other hand, the number of entries registered in the communication management table of the optical communication display apparatus 1 of user B is five, the light transmission section 4 regularly and cyclically transmits start codes and group names of these group.

It is assumed that at time t1, the eyes of user A meet the eyes of user B (they face each other) and the optical communication display apparatus 1 of user B has received start code STC1 and group name GPN1 that the optical communication display apparatus 1 of user A had transmitted. After having recognized a communication request with start code STC1, the optical communication display apparatus 1 of user B checks whether or not group name GPN1 is a group name of a group to which user B belongs. In other words, the optical communication display apparatus 1 of user B references the communication management table shown in FIG. 8B. Since the optical communication display apparatus 1 of user B also belongs to the group having group name GPN1, the optical communication display apparatus 1 of user B performs optical communications with the optical communication display apparatus 1 of user A. In other words, after having checked that the optical communication display apparatus 1 of user B belongs to the same group, the optical communication display apparatus 1 of user B transmits return code RTC1 registered in the communication management table shown in FIG. 8B as communication response information against group name GPN1 to the optical communication display apparatus 1 of user A and transmits providing data DTb correlated with the return code at time t2. As a result, the optical communication display apparatus 1 of user A receives return code RTC1 and providing data DTb.

After having checked return code RTC1 from the optical communication display apparatus 1 of user B who belongs to the group having group name GPN1, the optical communication display apparatus 1 of user A transmits providing data DTa correlated with group name GPN1 and registered in the communication management table shown in FIG. 8A and at time t3. After having received return code RTC1 at time t2 and providing data DTb at time t4, the optical communication display apparatus 1 of user A causes the display section 2 to display an indication based on one or both of providing data DTb and group name GPN1 at time t4. On the other hand, after having received providing data DTa from the optical communication display apparatus 1 of user A at time t3, the optical communication display apparatus 1 of user B causes the display section 2 to display an indication based on one or both of providing data DTa and group name GPN1 at time t5.

Figure 10A:
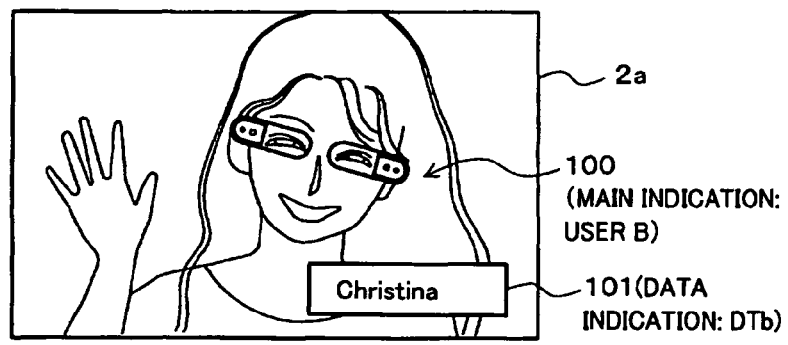
FIG. 10A and FIG. 10B are schematic diagrams describing examples of indications displayed according to an embodiment of the present invention.
Figure 10B:
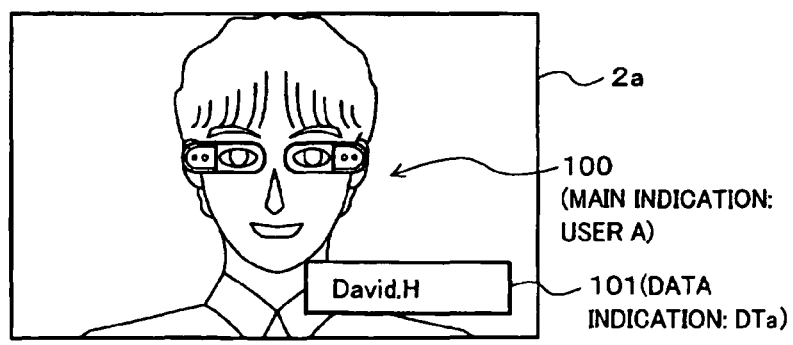

When user A faces user B, such communications are automatically performed. For example, the display section 2 of each user displays an indication based on providing data transmitted from each other. FIG. 10A and FIG. 10B show examples of indications. In FIG. 10A and FIG. 10B, it is assumed that the contents of providing data Da and Db are names. In other words, it is assumed that the name of user A is "David H." and the contents of providing data DTa correlated with group name GPN1 and registered in the communication management table shown in FIG. 8A of the optical communication display apparatus 1 are "David H." In addition, it is assumed that the name of user B is "Christina" and the contents of providing data DTb correlated with group name GPN1 and registered in the communication management table shown in FIG. 8B of the optical communication display apparatus 1 are "Christina".

In this case, when user A and use B face each other, communications shown in FIG. 9 are performed. Finally, information of "Christina" is provided to the optical communication display apparatus 1 of user A. In addition, information of "David H." is provided to the optical communication display apparatus 1 of user B. Thus, as shown in FIG. 10A, the display panel portions 2a of the optical communication display apparatus 1 of user A display an image of a visual scene captured by the image capturing section 3 at this point as a main indication 100. In addition, the display panel portions 2a overlay the main indication 100 with contents "Cristina" of providing data DTb as a data indication 101. On the other hand, as shown in FIG. 10B, the display panel portions 2a of the optical communication display apparatus 1 of user B displays an image of a visual scene captured by the image capturing section 3 at this point as a main indication 100. In addition, the display panel portions 2a overlays the main indication 100 with the contents "David H." of providing data DTa as a data indication 101.

In other words, when users face each other, their information is provided to each other. Indications based on the providing data are displayed. The main indication 100 shown in FIG. 10A and FIG. 10B is a scene in front of each user. The main indication 100 may be an image captured by the image capturing section 3. Instead, the main indication 100 may be an image that passes through the display panel portions 2a. In other words, the display panel portions 2a may partly display the data indication 101 in the through-state.

Figure 11A:
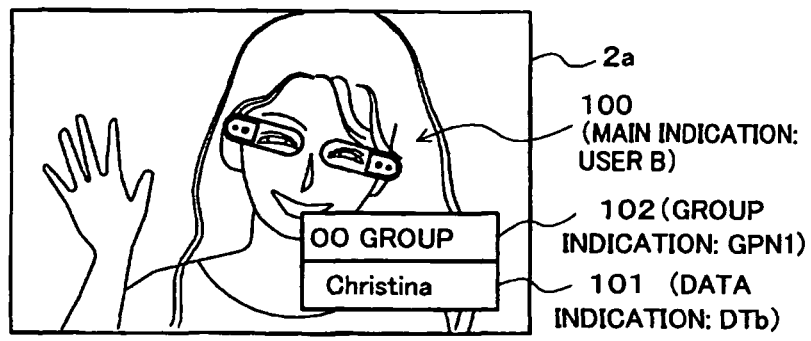
FIG. 11A and FIG. 11B are schematic diagrams describing examples of indications displayed according to an embodiment of the present invention.
Figure 11B:
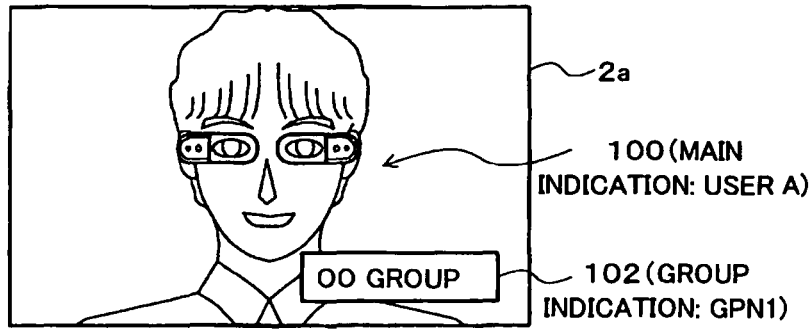

FIG. 11A shows an example of which "OO group" based on group name GPN1 as a group indication 102 is displayed in addition to the data indication 101. FIG. 11B shows an example of which "OO group" based on group name GPN1 as the group indication 102 is displayed without the data indication 101. For example, when providing data have not been received from the other apparatus side, only the group indication 102 can be displayed. Thus, since the data indication 101 based on providing data and/or the group indication 102 based on the group name can be displayed depending on a user's selection or whether providing data have been received, users who belong to the same group (who have registered the same group) can check information provided by the other apparatus side each other.

Groups that are registered include a group of friends of each user. For example, each user may select a group according to his or her hobby and/or preference. As user's hobbies and/or preferences, he or she may selectively register groups of music, music genres, sports, sports games, movies, novels, comics, authors, travels, driving, gourmet, fishing, and so forth. In this case, when unknown users face each other, if they belong to the same group of a hobby, communications shown in FIG. 9 are performed. As a result, they can check their group and providing data and knows that they have a common hobby and so forth.

The contents of providing data DTa and DTb that these users provide each other may be name information such as their real names or nicknames or their attribute information such as brief description of their hobbies or preferences. Of course, the contents may be attribute information such as a joined organization, age, sex, and date of birth. Each user can register such information as information that he or she can or wants to teach to other users who belong to the same group. The contents of providing data may be common in each group. Instead, the contents of providing data may be changed in each group. For example, in the communication management table shown in FIG. 8B, as registered as providing data DTb, DTc, and DTd, it is preferred that user B be able to discretely register the contents of providing data to each group name GPN. For example, providing data DTb for group name GPN1 may be real name data. Providing data DTc for group name GPN2 may be data that describes a user's hobby. Providing data may not been registered for group name GPN3. Providing data DTd for group name GPN4 may be information that represents a nickname.

Next, communications performed between the optical communication display apparatus 1 that user B wears and the optical communication apparatus 50 mounted on the apparatus-mounted object as shown in FIG. 3 will be described. It is assumed that as shown in FIG. 8B, group name GPN10 has been registered as a group of a particular information providing service in the communication management table of the optical communication display apparatus 1 of user B. In addition, it is assumed that the communication management table shown in FIG. 8C has been stored in the memory section 12 of the optical communication apparatus 50 shown in FIG. 3. In this case, in the communication management table shown in FIG. 8C, group name GPN10, start code STC10, return code RTC10, and providing data DTf have been correlated with each other.

When user B faces the apparatus-mounted object (a poster or the like) shown in FIG. 3, since their group names are the same, GPN10, the optical communication display apparatus 1 of user B performs communications with the optical communication apparatus 50 mounted on the apparatus-mounted object as shown in FIG. 12.

Since a plurality of entries have been registered in the communication management table of the optical communication display apparatus 1 of user B as shown in FIG. 8B, the optical communication display apparatus 1 regularly and cyclically transmits the start code and the group name of each entry. It is assumed that user B faces and watches the apparatus-mounted object at time t10. At this point, it is assumed that the optical communication apparatus 50 mounted on the apparatus-mounted object has received start code STC10 and group name GPN10 that the optical communication display apparatus 1 of user B had transmitted. After having recognized a communication request as start code STC10, the optical communication apparatus 50 determines whether or not group name GPN10 is a group name of a group to which the optical communication apparatus 50 belongs (from which the optical communication display apparatus 1 receives an information providing service). In other words, the optical communication apparatus 50 references the communication management table shown in FIG. 8C. In this case, since group name GPN10 is a group name of a group that has been registered to the communication management table of the optical communication apparatus 50, it determines that the optical communication display apparatus 1 has a right to receive information. Thus, the optical communication apparatus 50 also performs communications with the optical communication display apparatus 1. In other words, at time t11, the optical communication apparatus 50 transmits return code RTC10 registered in the communication management table shown in FIG. 8C as communication response information against group name GPN10 and transmits providing data DTf correlated with group name GPN10. As a result, the optical communication display apparatus 1 of user B receives return code RTC10 and providing data DTf from the optical communication apparatus 50.

Figure 13:
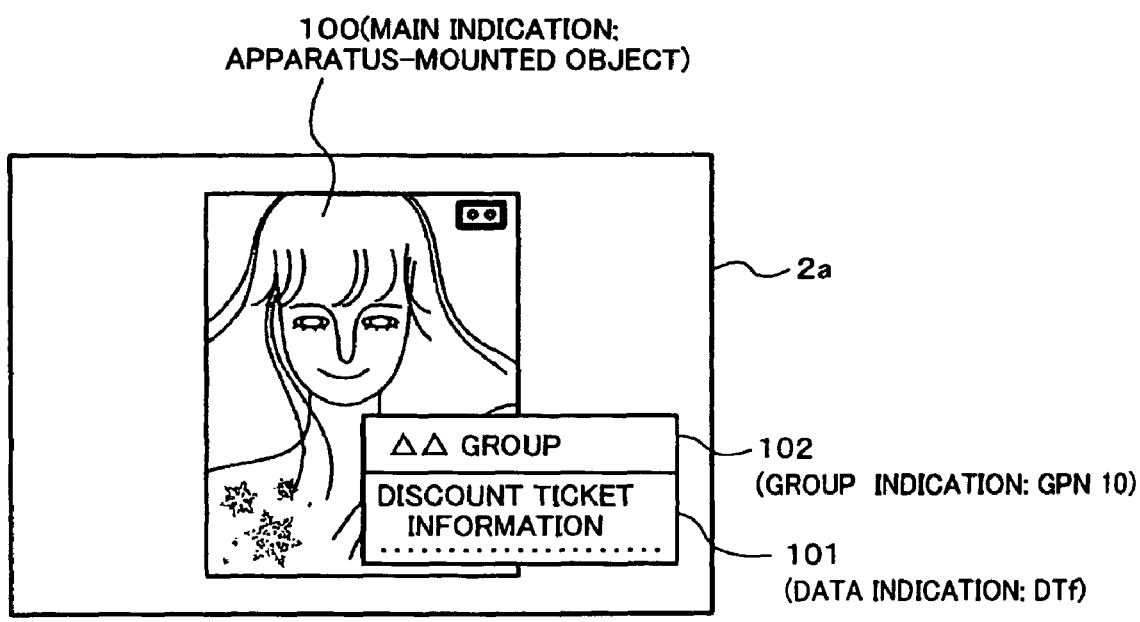
FIG. 13 is a schematic diagram describing a an example of an indication displayed according to an embodiment of the present invention.

When the optical communication display apparatus 1 has checked return code RTC10 as a response from the optical communication apparatus 50, the display section 2 of the optical communication display apparatus 1 displays an indication based on one or both of providing data DTf and group name GPN10 at time t12. FIG. 13 shows an example of the indication. It is assumed that providing data Df is information of contents about the poster as the apparatus-mounted object, for example information about a discount ticket. Thus, the display panel portions 2a of the optical communication display apparatus 1 of user B display an image of a visual scene captured by the image capturing section 3 at the point (namely, the image of the poster that user B watches) as a main indication 100 (or user B watches the image through the display panel portion 2a that is in the through-state) and overlays the main indication 100 with discount ticket information that is the contents of providing data DTf as a data indication 101. In addition, the display panel portions 2a display a group name "ΔΔ group" as a group indication 102. In this case, the display panel portions 2a can display one or both of the data indication 101 and the group indication 102.

When a particular user watches the apparatus-mounted object of the optical communication apparatus 50, such communications are automatically performed. Thus, the user can receive information about the apparatus-mounted object. It can be contemplated that the contents of providing data DTf are various types of information including data that represent the name of the apparatus-mounted object, data that represent an attribute such as uses of the apparatus-mounted object, information of an advertisement or description about the apparatus-mounted object, and information that represents the positions, directions, and so forth of a target to be successively explored.

For example, member-limited information such as discount information, pre-event information, and preview information for concerts, plays, events, movies, and so forth can be provided. In addition, the optical communication display apparatus 1 may be lent to a visitor of an art gallery, a museum, or the like. In addition, when the user has registered a group for an information service to the optical communication display apparatus 1, he or she may be provided with the information service about exhibits and visiting routes of such facilities. In addition, in a recreation event, information about a place or a target to be explored next or a place to go can be provided. In addition, in a building or a facility, information about a member-limited service may be provided. Likewise, in facilities of companies and organizations, member-limited information may be providing data. In stores, commercial products may be apparatus-mounted objects. Member-limited customers may be provided with detailed information, discount information, and so forth about commercial products as apparatus-mounted objects. When an animal such as a dog or a cat is an apparatus-mounted object, the name of the animal and information about the owner may be providing data.

In the foregoing examples, as shown in FIG. 8B, a start code and a return code are uniquely registered for each group name. However, on the basis of a precondition of which a start code as communication request information is transmitted together with a group name, a common start code may be used because each group can be identified by a group name. Likewise, when a return code as communication response information is transmitted together with a group name, a common return code may be used. When a common start code and a common return code are used, it is not necessary to register them to the communication management table. FIG. 9 and FIG. 12 show examples of communication procedures. For example, a return code and providing data may be transmitted separately, not simultaneously. When a start code is unique for each group, it is not necessary to transmit a group name together with a start code. Instead, a group name may be information that also functions as a start code (communication request information). Although many communication procedures may be contemplated, any communication procedure may be used as long as when apparatus that have registered the same group face each other, communications are automatically performed.

[4. Example of Process of Optical Communication Display Apparatus]

The optical communication display apparatus 1 shown in FIG. 5 (or the optical communication apparatus 30 shown in FIG. 6) that performs the foregoing optical communications and displays providing data will be described. Next, with reference to FIG. 14, a process of the system controller 10 will be described.

At step F101, the system controller 10 controls the transmission of a start code and a group name. In other words, the system controller 10 reads a start code and a group name of one group or each of a plurality of groups registered as an entry or entries in the communication management table and supplies them to the light emission control section 5. The light emission control section 5 modulates the start code and the group name and supplies the modulated start code and group name to the light transmission section 4. The light transmission section 4 optically transmits them. When a plurality of entries have been registered in the communication management table, the light transmission section 4 cyclically transmits a start code and a group name of each group.

While the system controller 10 is performing determination processes at steps F102, F103, and F104, the system controller 10 repeats the transmission process at step F101. In other words, the system controller 10 cyclically performs the transmission process at step F101 unless the determination conditions have been satisfied at steps F102, F103, and F104. Thus, in the normal state, the system controller 10 cyclically performs the transmission process for a start code and a group name of one group or each of a plurality groups registered in the communication management table.

Instead, the system controller 10 may perform the transmission process for a start code and a group name of one group that the user has selected or the system controller 10 has automatically selected. For example, it can be contemplated that the user selects any group for which the system controller 10 does not temporarily perform the transmission process. In addition, it can be contemplated that the user selects a date, a period of time, or the like for which the system controller 10 performs the transmission process for a start code and a group name of a particular group.

At step F102, the system controller 10 determines whether or not a start code has been received from another optical communication apparatus. At step F103, the system controller 10 determines whether or not a return code has been received from another optical communication apparatus. At step F104, the system controller 10 determines whether or not an operation termination (power off) command has been issued for example by the user.

Figure 14:
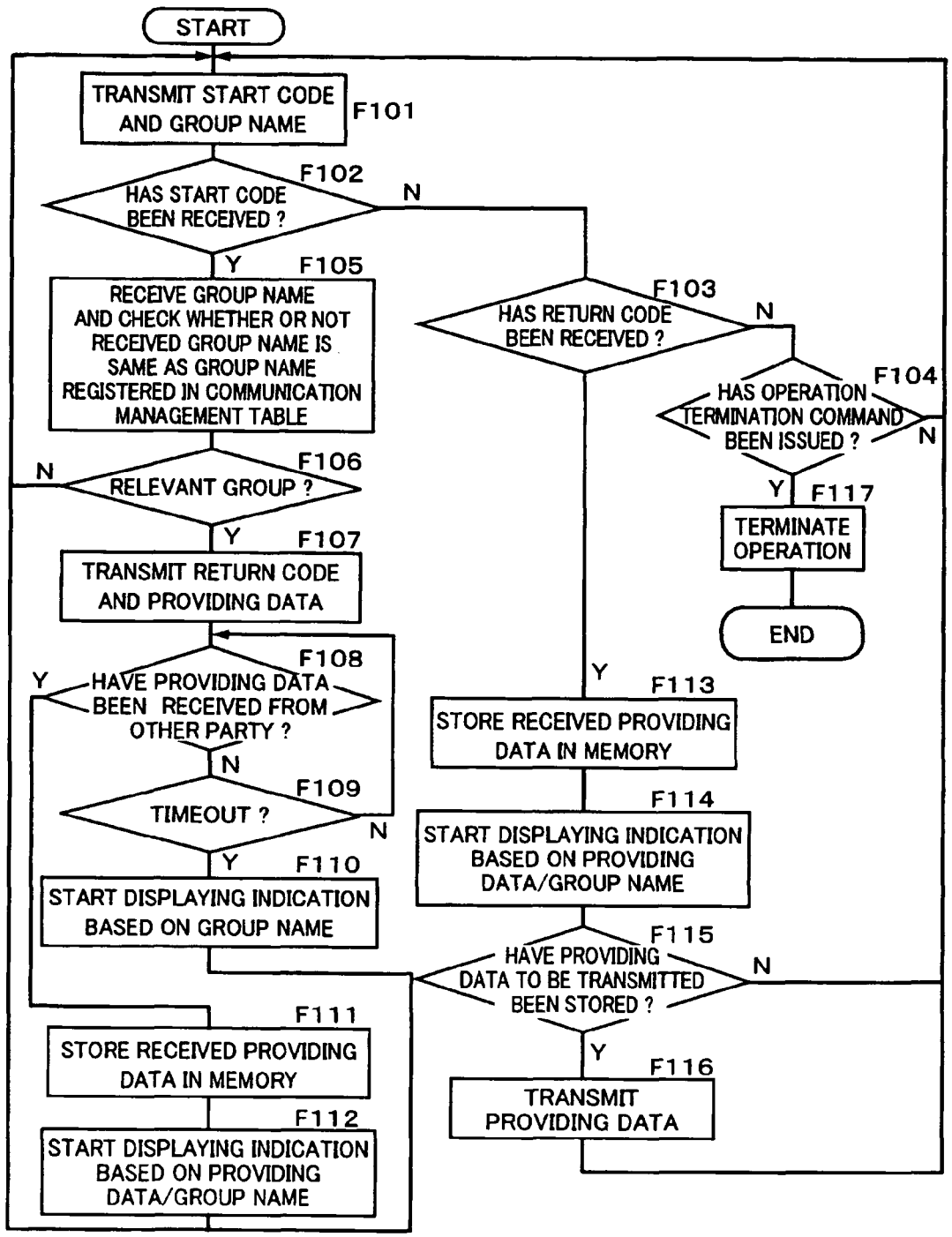
FIG. 14 is a flow chart showing examples of processes of an optical communication display apparatus and an optical communication apparatus according to an embodiment of the present invention.

A start code is detected at step F102 when the optical communication display apparatus 1 or the optical communication apparatus 30 that performs the process shown in FIG. 14 operates as the apparatus of user B shown in FIG. 9. In other words, the other optical communication apparatus receives a start code and a group name transmitted at step F101. On the other hand, a return code is detected at step F103 when the optical communication display apparatus 1 or the optical communication apparatus 30 that performs the process shown in FIG. 14 operates as the apparatus of user A shown in FIG. 9 or as the apparatus of user B shown in FIG. 12. In other words, the other optical communication apparatus sends back a return code (and providing data) against the start code and the group name transmitted at step F101.

First of all, the case of which a start code has been received at step F102 will be described. The image capturing section 3 and the capturing control section 6 receive a start code and a group name from the other optical communication apparatus, demodulate them, and supply the demodulated start code and group name to the system controller 10. Thereafter, the flow advances from step F102 to step F105. The system controller 10 references the communication management table stored for example in the memory section 12 and checks whether or not the received group name is a group name registered in the communication management table. In other words, the system controller 10 checks whether or not the other optical communication apparatus that has transmitted the start code and the group name belongs to the same group as that registered in the local communication management table. If the received group name is not a group name registered in the local communication management table, the system controller 10 does not perform the process of receiving a start code and a group name. Thereafter, the flow returns from step F106 to step F101. In other words, the system controller 10 determines that the group of the received group name be not the same as a group name registered in the local communication management table and does not perform the transmission process.

In contrast, when the received group name is the same as a group name registered in the local communication management table, the flow advances from step F106 to step F107. At step F107, the system controller 10 performs a transmission process for a return code and providing data. In other words, the system controller 10 reads a return code and providing data correlated with a group name that is the same as the received group name from the communication management table and transfers the return code and providing data to the light emission control section 5. The light emission control section 5 modulates the return code and providing data and supplies the modulated return code and providing data to the light transmission section 4. The light transmission section 4 optically transmits the modulated return code and providing data. When providing data correlated with the received group name have not been registered in the communication management table, the system controller 10 performs the transmission process only for a return code.

At step F108, the system controller 10 waits until the other optical communication apparatus transmits providing data.

At step F108, the system controller 10 waits until the other optical communication apparatus transmits providing data for a predetermined period of time. For example, the system controller 10 starts counting time after the system controller 10 has transmitted a return code. While the system controller 10 is not receiving providing data from the other optical communication apparatus, the system controller 10 determines whether or not a timeout has occurred at step F109. When the system controller 10 receives providing data before a timeout occurs, the flow advances from step F108 to step F111. At step F111, the system controller 10 causes the memory section 12 to store the received providing data. At step F112, the system controller 10 causes the display section 2 to display an indication based on the received providing data and/or the group name. For example, the display section 2 displays indications shown in FIG. 10A and FIG. 10B or indications shown in FIG. 11A and FIG. 11B. Thus, the user of the optical communication display apparatus 1 (or the optical communication apparatus 30) can see information transmitted from the other optical communication apparatus that a person is wearing to whom the user is watching.

When providing data have not been received and the system controller 10 has determined that a timeout has occurred, the flow advances to step F110. At step F110, the system controller 10 causes the display section 2 to display an indication based on this group name as shown in FIG. 11B. As a result, the user of the optical communication display apparatus 1 (or the optical communication apparatus 30) knows that the person whom the user is watching belongs to the same group. When providing data have not been received, the system controller 10 may not cause the display section 2 to display an indication based on the group name. In this case, the flow returns to step F101.

At step F112 or step F110, the display section 2 may overlay an image captured by the image capturing section 3 with an indication based on the received providing data and/or the group name. Instead, while the display panel portions 2a are in the through-state, the display section 2 may display an indication based on the providing data and the group name. The system controller 10 may cause the display section 2 to stop displaying an indication based on the providing data and/or the group name displayed at step F112 or F110 in a predetermined condition. For example, the system controller 10 may cause the display section 2 to display an indication based on the providing data and/or the group name for a predetermined period of time or to stop displaying it according to a user's operation. Instead, the system controller 10 may cause the capturing control section 6 to analyze a captured image (namely, a scene in front of the user) and determine whether or not the user is watching the other party (other optical communication party). When the user turns his or her head and there is no other optical communication party in the captured image, the system controller 10 may cause the display section 2 to stop displaying an indication based on the providing data and/or the group name.

Next, the case of which a return code has been received at step F103 will be described. The image capturing section 3 and the capturing control section 6 receive a return code and providing data from the other optical communication apparatus, demodulate the return code and providing data, and informs the system controller 10 that the return code has been received. Thereafter, the flow advances from step F103 to step F113. At step F113, the system controller 10 causes the memory section 12 to store the providing data. When providing data are not received, the system controller 10 omits this step. Thereafter, the flow advances to step F114. At step F114, the system controller 10 causes the display control section 7 to display an indication based on the providing data and/or the group name. As a result, the display control section 7 displays the indications shown in FIG. 10A and FIG. 10B or the indications shown in FIG. 11A and FIG. 11B. Thus, the user of the optical communication display apparatus 1 (or the optical communication apparatus 30) can see information received from the other optical communication apparatus that a person is wearing to whom the user is watching. Instead, the display control section 7 displays an indication as shown in FIG. 13. Thus, the user of the optical communication display apparatus 1 (or the optical communication apparatus 30) can see information transmitted from the optical communication apparatus 50 mounted on the apparatus-mounted object. In this case, the indication can be controlled in various manners as in those at steps F112 and F110.

Thereafter, the flow advance to step F115. At step F115, the system controller 10 determines whether or not there are providing data to be transmitted to the other party. In other words, the system controller 10 determine whether or not providing data correlated with this group name (the group name correlated with the received return code) have been registered in the communication management table. When providing data have not been registered, flow returns to step F101. When providing data correlated with this group name have been registered, the flow advances to step F116. At step F116, the system controller 10 performs a transmission process for the providing data. In other words, the system controller 10 reads providing data correlated with this group name from the communication management table and transfers the providing data to the light emission control section 5. The light emission control section 5 modulates the providing data and supplies the modulated providing data to the light transmission section 4. The light transmission section 4 optically transmits the modulated providing data. Thereafter, the flow returns to step F101.

When the operation termination command has been issued at step F104, the flow advances to step F117. At step F117, the system controller 10 performs an operation termination process of terminating the operation of each section and turning off the power of the apparatus. When the system controller 10 performs the process shown in FIG. 14, the optical communication display apparatus 1 or the optical communication apparatus 30 that the user is wearing performs the operations shown in FIG. 9 to FIG. 13.

[5. Example of Process of Optical Communication Apparatus Mounted on Apparatus-Mounted Object]

Figure 15:
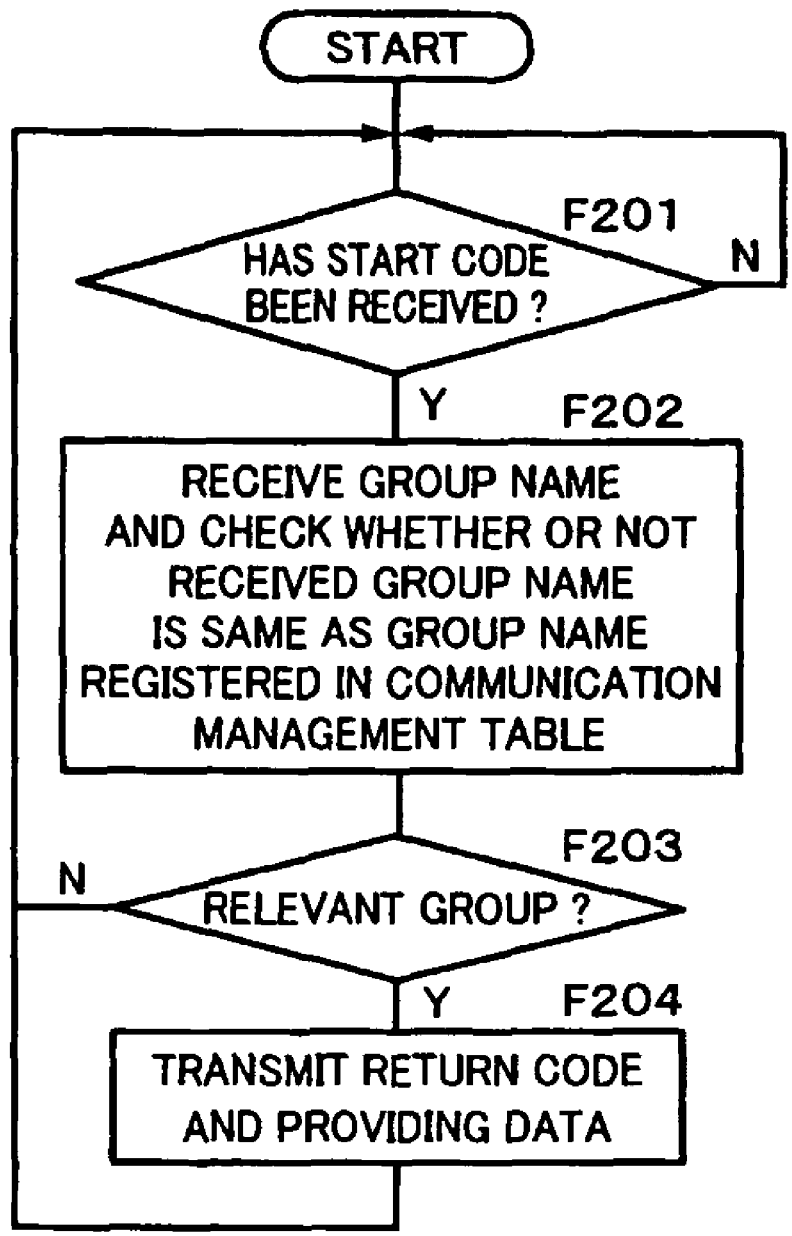
FIG. 15 is a flow chart showing an example of a process of an optical communication apparatus according to an embodiment of the present invention, the optical communication apparatus being mounted on an apparatus-mounted object.

FIG. 15 shows an example of a process of the system controller 10 of the optical communication apparatus 50, shown in FIG. 7, mounted on an apparatus-mounted object other than a person. At step F201, the system controller 10 of the optical communication apparatus 50 determines whether or not a start code has been received from the other optical communication apparatus (in this case, the optical communication display apparatus 1 or optical communication apparatus 30 that a person is wearing).

A start code is detected at step F201 when the user who is wearing the optical communication display apparatus 1 or the optical communication apparatus 30 faces an apparatus-mounted object of the optical communication apparatus 50 that performs the process shown in FIG. 15, he or she turns his or her eyes to the apparatus-mounted object, and the optical communication display apparatus 1 or the optical communication apparatus 30 has received a start code and a group name transmitted at step F101 shown in FIG. 14.

The light reception section 8 and the data demodulation section 9 receive the start code and group name from the other optical communication apparatus, demodulate the start code and the group name, and supply the demodulated start code and group name to the system controller 10. Thereafter, the flow advances from step F201 to step F202. At step F202, the system controller 10 references the communication management table stored, for example, in the memory section 12 and checks whether or not the received group name is the same as a group name registered in the communication management table. In other words, the system controller 10 checks whether or not the other optical communication apparatus that has transmitted the start code and group name belongs to the same group as a group to which the local optical communication apparatus belongs and has a right to receive providing data from the local optical communication apparatus. If the received group name is not the same as a group name registered in the local communication management table, the system controller 10 does not perform a process for the received start code and group name. Thereafter, the flow returns from step F203 to step F201. In other words, the system controller 10 determines that the group of the received group name be not the same as a group name registered in the local communication management table. As a result, the system controller 10 does not perform optical communications with the other optical communication apparatus.

In contrast, when the received group name is the same as a group name registered in the local communication management table, the flow advances from step F203 to step F204. At step F204, the system controller 10 performs a transmission process for a return code and providing data. In other words, the system controller 10 reads a return code and providing data correlated with the received group name from the communication management table and transfers them to the light emission control section 5. The light emission control section 5 modulates the return code and the providing data and supplies the modulated return code and providing data to the light transmission section 4. The light transmission section 4 optically transmits the modulated return code and providing data. Thereafter, the flow returns to step F201.

When the system controller 10 of the optical communication apparatus 50 mounted on the apparatus-mounted object performs the process shown in FIG. 15, the optical communication apparatus 50 performs communications shown in FIG. 12 with the optical communication display apparatus 1 or the optical communication apparatus 30 that the user is wearing. As a result, an information providing service can be performed for the user.

Instead, in the optical communication apparatus 50 mounted on an apparatus-mounted object, the light transmission section 4 that emits light at a narrow directive angle may regularly transmit a start code. When the optical communication apparatus 50 receives a return code from the optical communication display apparatus 1 or the optical communication apparatus 30 that the user is wearing, the optical communication apparatus 50 may transmit providing data.

[6. Effects of Embodiments and Modification and Extension of Embodiments]

In the foregoing embodiments, when the users who are wearing the optical communication display apparatus 1 or the optical communication apparatus 30 watch each other, the optical communication display apparatus 1 (or the optical communication apparatus 30) perform optical communications therebetween. As a result, when the users face each other, they can provide and receive information to and from the other. Thus, various communication opportunities can be created. When a user who is wearing the optical communication display apparatus 1 or the optical communication apparatus 30 watches an apparatus-mounted object on which the optical communication apparatus 50 has been mounted, the optical communication display apparatus 1 or the optical communication apparatus 30 performs optical communications with the optical communication apparatus 50 and it provides information to the optical communication display apparatus 1 or the optical communication apparatus 30. As a result, the user can receive an information providing service from the optical communication apparatus 50.

When it has been determined that both parties belong to the same group having a group name as identification information, the other party recognizes the local party as a communication target and optically transmits providing data to the local party. Thus, even if users who are wearing the optical communication display apparatus 1 or the optical communication apparatus 30 face each other, the apparatus do not transmit providing data to the other. Thus, the optical communication display apparatus 1 or the optical communication apparatus 30 can provide information only to a proper party. In addition, only when a group name of a group to which the optical communication display apparatus 1 or the optical communication apparatus 30 belongs is the same as a group name of the optical communication apparatus 50 mounted on an apparatus-mounted object, the optical communication apparatus 50 transmits providing data. Thus, the optical communication apparatus 50 can provide information only to a user who satisfies a predetermined condition and who has been registered to the same group as a group to which the optical communication apparatus 50 belongs. For example, the optical communication apparatus 50 can provide information to limited members including general users who have a predetermined interest, members of companies and/or organizations, designated persons such as facility supervisors, and charge-based members.

When visible light is used for optical communications, the users can easily recognize blinking of the light emitting section 4a each other. Thus, when a person face many persons, he or she can easily recognize a party who is performing information communications. In contrast, when infrared light is used for optical communications, since the users are not able to see blinking of the light emitting section 4a each other, the users and the surrounding persons can be prevented from feeling awkward or uncomfortable.

In addition, although the optical communication display apparatus 1 and the optical communication apparatus 30 use the image capturing section 3 as a light reception means of optical communications, since the image capturing section 3 performs an image capturing operation and an optical communication operation in common, the optical communication display apparatus 1 and the optical communication apparatus 30 can be simply structured. When the image capturing section 3 captures an image and the memory section 12 stores the captured image data, the user can record daily scenes. When optical communications are performed while daily captured image data are being recorded, if providing data, a group name, and so forth can be recorded together with the captured image data, the user can check the providing data and the group name together with the captured image data that are reproduced. When the optical communication display apparatus 1 and the optical communication apparatus 30 have the light reception section 8 and the data demodulation section 9 of the optical communication apparatus 50 instead of the image capturing function (the image capturing section 3 and the capturing control section 6), the optical communication display apparatus 1 and the optical communication apparatus 30 can be simply structured and light-weighted.

As the structures and processes of the optical communication display apparatus 1, the optical communication apparatus 30, and the optical communication apparatus 50, many modifications and extensions of the foregoing embodiments can be contemplated. Next, modifications and extensions of the foregoing embodiments will be described in the scope of the present invention.

Figure 16:
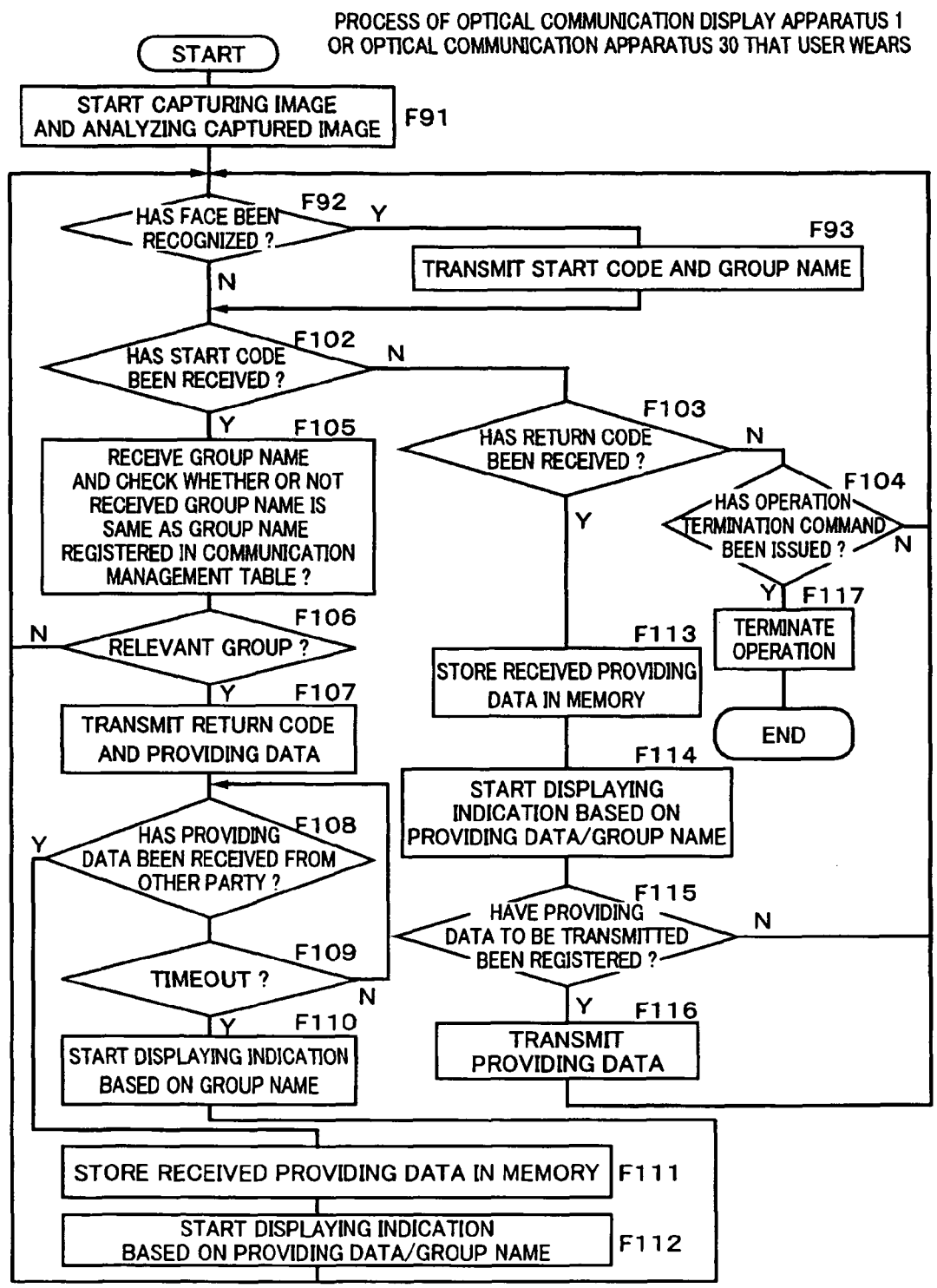
FIG. 16 is a flow chart showing other examples of processes of an optical communication display apparatus and an optical communication apparatus according to an embodiment of the present invention.

FIG. 16 shows another example of a process of the system controller 10 of the optical communication display apparatus 1 or the optical communication apparatus 30. In FIG. 16, the same steps as those of FIG. 14 are designated by the step numbers and their description will be omitted. In FIG. 16, for a transmission process for a start code and a group name, steps F91, F92, and F93 are added. In this case, at step F91, the system controller 10 causes the capturing control section 6 to start analyzing a captured image. In this case, the capturing control section 6 analyzes whether or not the captured image contains an image of a person.

When the capturing control section 6 has not analyzed that a scene of a captured image does not contain an image of a person, namely the captured image control section 6 has not recognized a person in front of the user, the flow advances from step F92 to steps F102, F103, and F104 for determinations processes. Thereafter, the flow returns to step F92. When the capturing control section 6 has recognized an image of a person as the image analyzed result, the flow advances to step F93. At step F93, the system controller 10 controls the transmission of a start code and a group code. In other words, the system controller 10 reads a start code and a group name of one group or each of a plurality of groups as one entry or a plurality of entries registered in the communication management table and supplies the start code and the group name to the light emission control section 5. The light emission control section 5 modulates the start code and the group name and supplies the modulated start code and group name to the light transmission section 4. The light transmission section 4 optically transmits the modulated start code and group name. Thereafter, the flow advances to steps F102, F103, and F104 as determination processes. Thereafter, the system controller 10 performs the same steps as those shown in FIG. 14.

In other words, in the example of the process shown in FIG. 16, a start code and a group name are optically transmitted only when it has been detected that there is a person in the visual line direction of the user. When there is no person in front of the user, it is needless to transmit a start code and a group name. Thus, since a start code and a group name are transmitted only when a person in front of the user has been recognized, the process can be effectively performed and the power consumption can be decreased. The case of which a start code and a group name are transmitted when it has been recognized that there is a person in front of the user is applied for communications between the optical communication display apparatus 1 or the optical communication apparatus 30 that the users are wearing. Thus, a start code and a group name are not transmitted to the optical communication apparatus 50 mounted on an apparatus-mounted object. However, in this case, if the optical communication apparatus 50 mounted on the apparatus-mounted object regularly transmits a start code and a group name, when the optical communication display apparatus 1 or the optical communication apparatus 30 that performs the process shown in FIG. 16 has received the start code and the group name from the optical communication apparatus 50, the flow advances to step F102. Thus, communications between the optical communication display apparatus 1 or the optical communication apparatus 30 and the optical communication apparatus 50 can be performed.

Instead, depending on the image analyzing performance of the captured image control section 6, it may recognize another optical communication apparatus rather than a person. In the optical communication display apparatus 1, the optical communication apparatus 30, and the optical communication apparatus 50, a predetermined square shape (a part of a square) or a mark may be registered. When the optical communication display apparatus 1, the optical communication apparatus 30, or the optical communication apparatus 50 recognizes such a square shape or such a mark, the optical communication display apparatus 1, the optical communication apparatus 30, or the optical communication apparatus 50 may transmit a start code and a group name.

Next, an example of an operation of a display process based on providing data and a group name will be described. As exemplified in FIG. 10A, FIG. 10B, FIG. 11A, FIG. 11B, and FIG. 13, indications are displayed on the basis of providing data and a group name. An indication based on both providing data and a group name, an indication based on providing data, or an indication based on a group name may be selected or changed by the user.

When these indications are displayed, it is preferred that the luminance, chromaticity, transmissivity, and so forth of the data indication 101 and the group indication 102 be adjusted on the basis of the luminance and color of the main indication 100, in particular, the luminance and color of the background of the data indication 101 and the group indication 102. The visibility of the data indication 101 and the group indication 102 is improved for example by selecting the color and luminance complementary to the background image.

It can be contemplated that the data indication 101 and the group indication 102 are displayed at various positions on the screen of the display panel portions 2a. The data indication 101 and the group indication 102 may be displayed at the bottom portion or the top portion of the screen such that they are separated from the main indication 100. As shown in FIG. 10A, FIG. 10B, FIG. 11A, FIG. 11B, and FIG. 13, the main indication 100 may be overlaid with the data indication 101 and the group indication 102. Instead, the user may select the positions of the data indication 101 and the group indication 102 on the screen. When the amount of data of indications displayed on the basis of providing data and a group name is large, all the data of the indications may be displayed by scrolling or page-feeding. In addition, it can be contemplated that providing data are image data or contains image data. In this case, it can be contemplated that image data are displayed in a child screen or image data are displayed on the entire screen.

Figure 17:
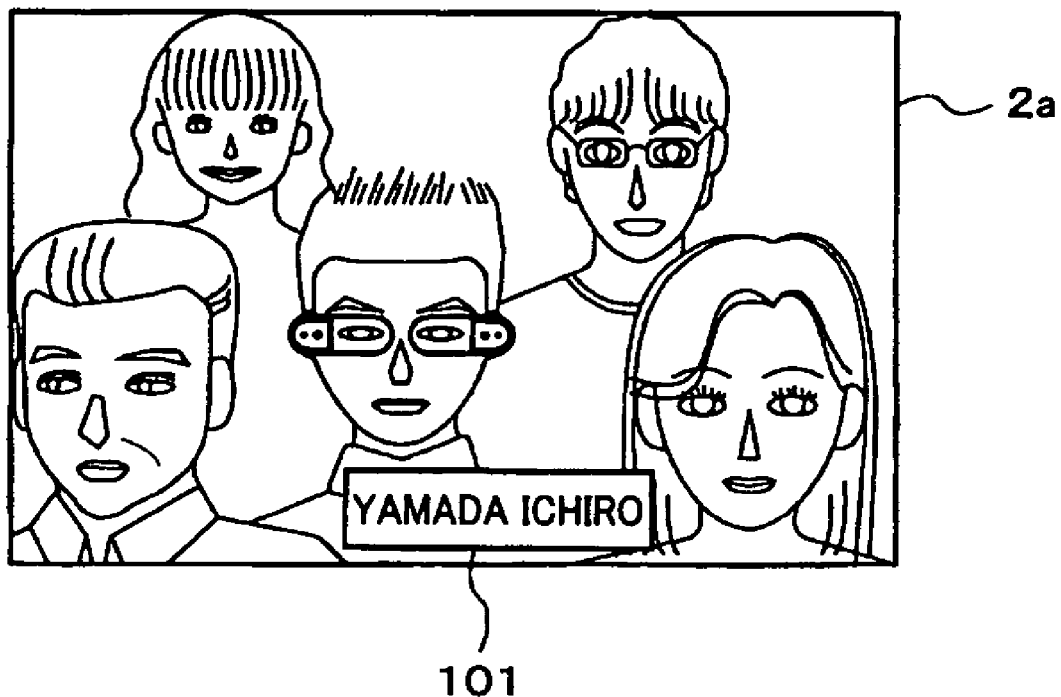
FIG. 17 is a schematic diagram describing a display position of providing data according to an embodiment of the present invention.

It is preferred that the data indication 101 and the group indication 102 be displayed near an image of the other party as the other communication party. For example, as shown in FIG. 17, if there are a plurality of persons in front of the user and they are displayed on the display panel portions 2a (or the user sees them through the display panel portions 2a), when the position of the data indication 101 on the screen of the display panel portions 2a is close to the position of the other communication party on the screen, the user can easily recognize the person who has transmitted providing data. By analyzing a captured image, the lighting position of the transmission light of the other party can be detected as a position on the screen. Thus, the display positions of the data indication 101 and the group indication 102 are decided on the basis of the detected lighting position. Instead, when the lighting position is detected, it may be displayed with a pointer or the like on the screen. Thus, even if the positions of the data indication 101 and the group indication 102 are fixed for example at a corner of the screen, the user can easily recognize the other communication party.

Figure 18:
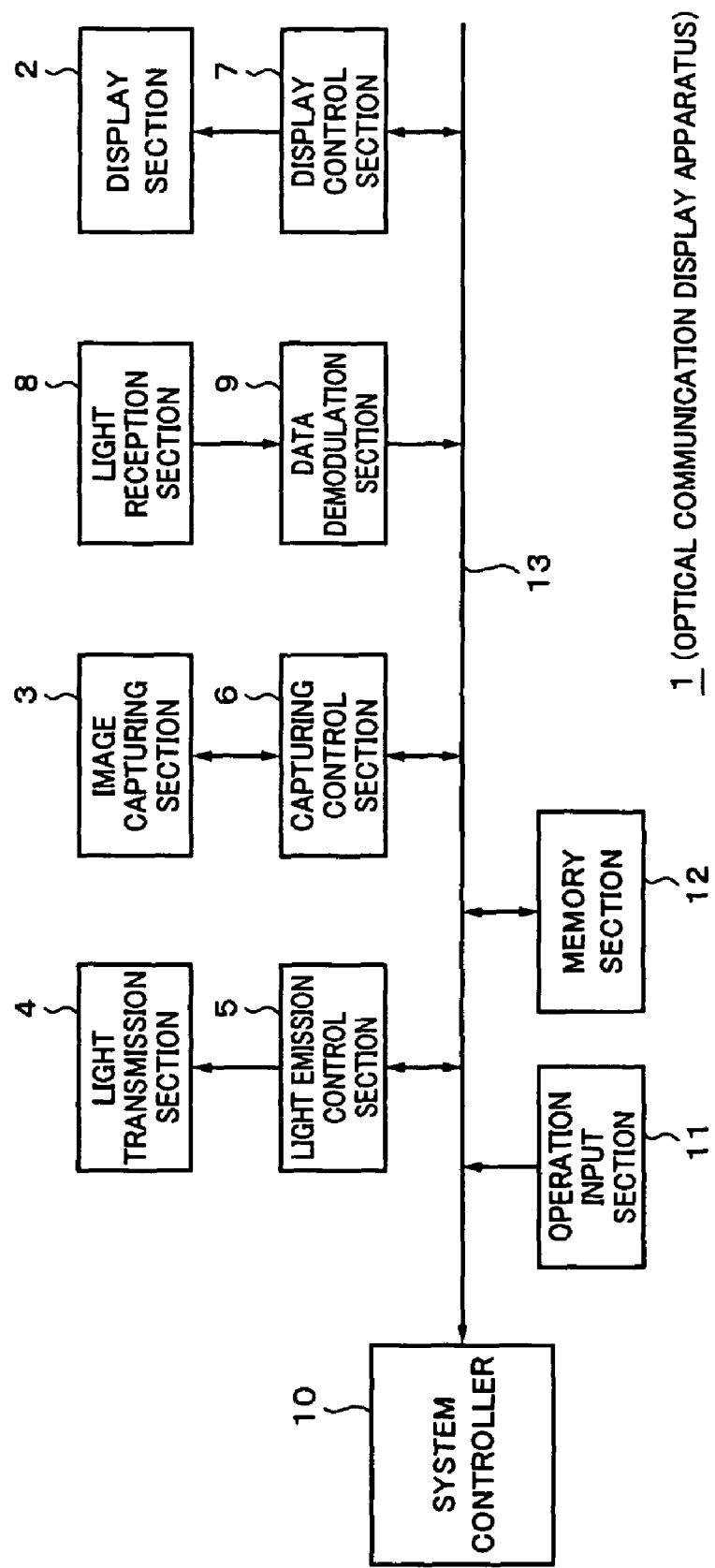
FIG. 18 is a block diagram showing another example of a structure of an optical communication display apparatus or an optical communication apparatus according to an embodiment of the present invention.

As an example of a structure of the optical communication display apparatus 1 or the optical communication apparatus 30, the light reception section 8 and the data demodulation section 9 may be added along with the image capturing section 3 and the capturing control section 6 as shown in FIG. 18. In this structure, it can be contemplated that the image capturing section 3 and the captured image control section 6 operate only as the image capturing function and the light reception section 8 and data demodulation section 9 operates only as the reception function of optical communications.

In addition, in this structure, it can be contemplated that the optical communication display apparatus 1 or the optical communication apparatus 30 operates in the following manner. It is assumed that optical communications are performed with light having wavelengths in an invisible region such as infrared light. The image capturing section 3 has a structure that can detect light in the visible region and light in an invisible region such as infrared light and has a filter that passes only visible light. The light reception section 8 detects light in an invisible region such as infrared light. In the normal state, the image capturing section 3 captures an image of visible light with the foregoing filter and the display section 2 displays the captured image. On the other hand, the light reception section 8 and the data demodulation section 9 detect a start code transmitted from the other optical communication apparatus on the other party side. When the other party belongs to the same group as that of the local optical communication apparatus and it starts communications, the image capturing section 3 causes the filter not to operate such that the user can recognize a light emitting pattern of optical communications as a captured image. Thus, unless communications are performed between the same group, the user is unable to see lighting of the other optical communication apparatus. As a result, the user can be prevented from being visually disturbed by excessive lighting. In contrast, when communications are performed between the same group, the user can see lighting of the other party side. Thus, the user can easily recognize the other communication party.

All or part of communications of a group name, a start code, a return code, and providing data optically communicated may be encrypted. At least, communications of providing data may be encrypted. The communications may be performed with an encryption key common in the system. When a unique encryption key is used for each group, it is preferred that communications of each group be secured. For example, as shown in FIG. 19, unique encryption keys K1, K2, K3, and so forth for individual groups are registered in the communication management table. When the optical communication display apparatus 1 having group name GPN2 communicate with each other, providing data DTc is encrypted with encryption key K2 and the encrypted data are transmitted. When encryption key K2 for group name GPN2 has been registered in the communication management table on the other party side, providing data DTc can be decrypted on the other party side.

It can be contemplated that providing data are audio data. When the optical communication display apparatus 1 or the optical communication apparatus 30 has an audio output section such as an earphone and an audio signal processing section. In this case, when the optical communication display apparatus 1 or the optical communication apparatus 30 has received audio data as providing data, it can be contemplated that the optical communication display apparatus 1 or the optical communication apparatus 30 outputs audio data to the earphone or the like so that the user can hear the audio data.

[7. Another Extension of Embodiment (Counting Based on Communication log)]

Next, another extension of an embodiment of the present invention will be described. In this extension, when the optical communication display apparatus 1 or the optical communication apparatus 30 that a person is wearing and the optical communication apparatus 50 mounted on an apparatus-mounted object perform optical communications, these apparatus store a communication log (communication history information), perform a counting process based on the communication log, and generate useful information (ranking information).

Figure 20:
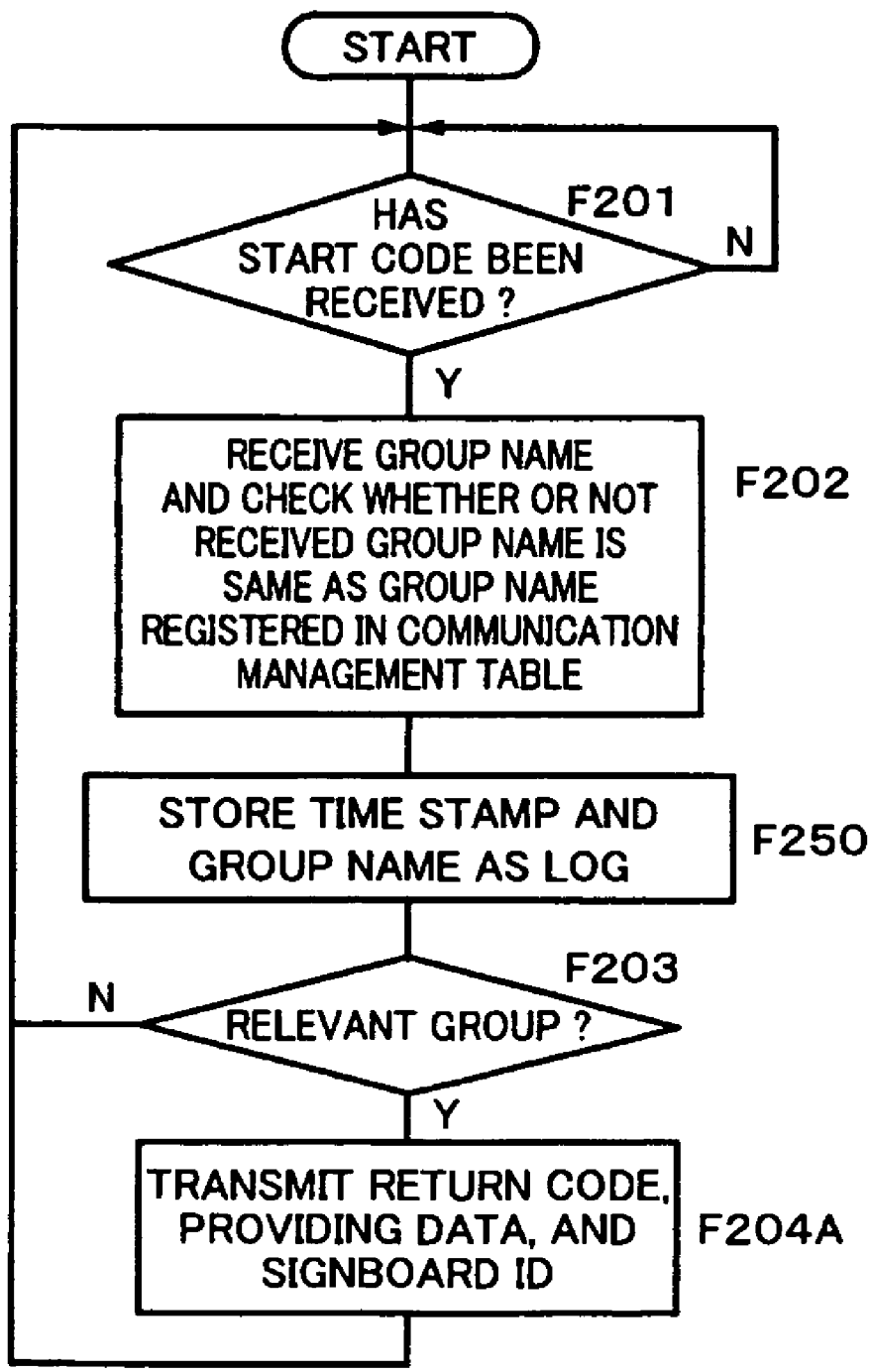
FIG. 20 is a flow chart showing an example of a process of an optical communication apparatus mounted on an apparatus-mounted object according to an embodiment of the present invention, the process including a process of storing a log.

First, with reference to FIG. 20, an example of the process of the optical communication apparatus 50 mounted on an apparatus-mounted object other than a person will be described. In this extension, the apparatus-mounted object is for example a signboard. In FIG. 20, the same steps as those in FIG. 15 are designated by the same step numbers and their redundant description will be omitted. In the example of the process shown in FIG. 20 of the system controller 10 of the optical communication apparatus 50, step F250 is added to the process shown in FIG. 15. In other words, at step F201, the optical communication apparatus 50 receives a start code from the other optical communication apparatus (the optical communication display apparatus 1 or the optical communication apparatus 30 that a person is wearing). At step F202, the optical communication apparatus 50 receives a group name and checks whether or not the received group name is the same as a group name registered in the communication management table. At step F250, the optical communication apparatus 50 performs a process of storing a log. For example, the system controller 10 stores a time stamp and a group name as a communication log, for example, to the memory section 12.

A time stamp is information about the reception time of a start code in the format of year, month, day, hour, minute, and second. The system controller 10 counts the current date and time in the format of year, month, day, hour, minute, and second with an internal clock function and adds the reception time of the start code to the communication log.

Figure 22:
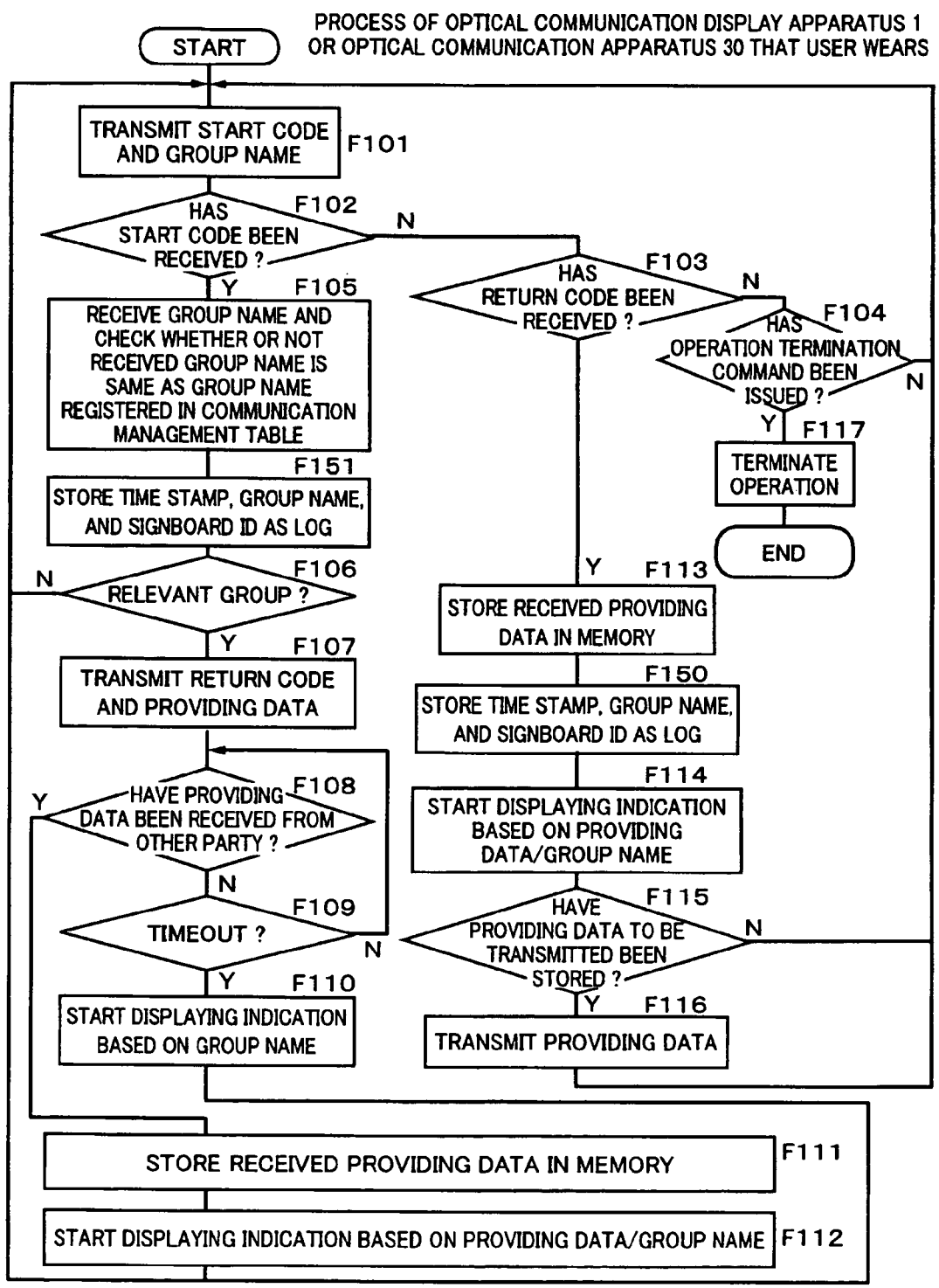
FIG. 22 is a flow chart showing an example of a process of an optical communication display apparatus or an optical communication apparatus according to an embodiment of the present invention, the process including a process of storing a log.

When the group name transmitted from the other optical communication apparatus on the other party side is the same as a group name registered in the communication management table of the optical communication apparatus 50, the flow advances from step F203 to F204A. At step F204A, the optical communication apparatus 50 transmits a return code and providing data to the other optical communication apparatus. In this example, the optical communication apparatus 50 transmits a signboard ID as identification information of the apparatus-mounted object (in this case, a signboard), on which the optical communication apparatus 50 has been mounted, together with the return code and providing data. The system controller 10 has stored a signboard ID (an ID of this signboard or a common ID of signboards that describe the same information). The system controller 10 transmits the signboard ID. As shown in FIG. 22, the signboard ID is transmitted such that the optical communication display apparatus 1 or the optical communication apparatus 30 that a person is wearing stores and counts the communication log. Thus, the optical communication apparatus 50 does not use a signboard ID. As a result, unless the optical communication display apparatus 1 or the optical communication apparatus 30 that a person is wearing does not store a log including a signboard ID, it is not necessary for the optical communication apparatus 50 to transmit a signboard ID.

In the process shown in FIG. 20, whenever a start code is received, its information is stored in a communication log. Information of the communication log is stored as shown in FIG. 21A. In other words, a group name is transmitted from the optical communication display apparatus 1 or the optical communication apparatus 30 of a user who is watching the signboard and is stored in the communication log along with a time stamp. Since such information is stored in the communication log, when log information is counted at a particular time, beneficial information can be obtained. FIG. 21B shows an example of which information of a communication log is counted for one month of March and ranking data of group names are generated. Log data of March 2007 are extracted on the basis of time stamps and counts of group names are obtained. As a result, data that represent ranking of counts of group names can be generated. This ranking data become data that represent the number of persons who watched a particular signboard, group names of groups to which persons who watched the signboard belong, and the number of times persons who belong to these groups watched the signboard. When group names have been registered on the basis of the foregoing hobbies and preferences, information about hobbies and preferences of persons who watched the signboard and those of persons who did not watch it can be obtained. In other words, this ranking data can be used to estimate advertisement effects of signboards and obtain an index for more effective advertisements.

In this example, the apparatus-mounted object is a signboard. When the apparatus-mounted object of the optical communication apparatus 50 is a commercial product or an exhibit, the ranking data become information that represents the number of persons who watched it, the number of persons who picked and watched it, and hobbies and preferences (group names) that persons who had an interest in it tend to have. When the apparatus-mounted object is a commercial product for example a music CD or a DVD, the ranking information can be used to determine the effect of an album jacket (whether or not it is attractive). Of course, the ranking information becomes effective information to determine the attractivity of any commercial product such as an electric appliance, cloth, a book, furniture, or commodity and the tendency of hobbies and preferences of persons who had an interest to it.

In the process shown in FIG. 20, when a start code is received, log data are stored regardless of whether or not the transmitted group name is the same as a group name registered in the optical communication apparatus 50. Instead, immediately before or immediately after step F204A, log data may be stored. In this case, only when a user who belongs to the relevant group name watched a signboard or the like, log data are stored.

As described in FIG. 15, the optical communication apparatus 50 mounted on the apparatus-mounted object may transmit a start code. In addition, when the optical communication apparatus 50 has received a return code from the other optical communication apparatus, the optical communication apparatus 50 may transmit providing data. In such a case, it is necessary to store log data when the optical communication apparatus 50 receives a return code. In addition, it is preferred that a communication log contain only a group name as user side information, not information that would infringe privacy of the user.

There may be many output formats of the generated ranking data. For example, a display section and an operation section may be added to the structure shown in FIG. 7. Ranking data may be displayed according to an operation of the supervisor of the optical communication apparatus 50. In addition, a recoding section having a portable record medium such as an optical disc or a memory card may be added. When the supervisor or the like attaches the portable record medium to another reproducing apparatus, he or she can watch the ranking data with another reproducing apparatus. When a communication section is added to the optical communication apparatus 50, ranking data can be transmitted. As a result, the supervisor or the like can watch the ranking data with the reception side apparatus.

Next, a recording process and a counting process for a communication log of the optical communication display apparatus 1 and the optical communication apparatus 30 that a person wears will be described. FIG. 22 shows a process of the system controller 10 of the optical communication display apparatus 1 or the system controller 10. In the process shown in FIG. 22, steps F150 and F151 of storing a log are added to the process shown in FIG. 14. In FIG. 22, the same steps as those of FIG. 14 are designated by the same step numbers and their description will be omitted.

In FIG. 22, when a return code has been received at step F103, the flow advances to step F150. At step F150, a storing process for a communication log is performed. Instead, when a start code has been received at step F102, the flow advances to step F151. At step F151, a storing process for a communication log is performed. In other words, when a start code or a return code is received from the other optical communication apparatus (the optical communication display apparatus 1 or the optical communication apparatus 30 of the other person or the optical communication apparatus 50 mounted on an apparatus-mounted object such as a signboard) at steps F150 and F151, the system controller 10 causes for example the memory section 12 to store a time stamp, a group name, and a signboard ID as a communication log. A time stamp is information that represents reception date and time of a start code or a return code in the format of year, month, day, hour, minute, and second. The system controller 10 counts the current date and time in the format of year, month, day, hour, minute, and second with the internal time function and adds the reception date and time of the start code or return code in the format of year, month, day, hour, minute, and second as a time stamp to the communication log. At step F151, a group name is a group name received at step F105. At step F150, a group name is a group name that causes the other party to transmit a return code (namely, a group name that the local optical communication apparatus has transmitted at step F111). When the other party of the optical communications is the optical communication apparatus 50 mounted on the signboard and performs the process shown in FIG. 20, the optical communication apparatus 50 transmits a signboard ID along with a return code. In this case (when the local optical communication apparatus has received the signboard ID), the signboard ID is also added to the log data. In this case, a "signboard ID" is used. When the optical communication apparatus 50 is mounted on a commercial product or an exhibit, "a commercial product ID" or "an exhibit ID" is used instead of a signboard ID.

In the process shown in FIG. 22, whenever a start code and a return code are received, a communication log is stored. Information of a communication log is stored as shown in FIG. 23A. In other words, a group name transmitted from the optical communication display apparatus 1 or the optical communication apparatus 30 of the other person as the other communication party or the optical communication apparatus 50 of the apparatus-mounted object such as a signboard is stored along with a time stamp. When the other communication party is the optical communication apparatus 50 mounted on a signboard, a signboard ID is also stored. In the log data shown in FIG. 23A, group names GPN10 and GPN15 are group names of the optical communication apparatus 50 mounted on signboards. FIG. 23A shows that a signboard ID is stored along with a group name. On the other hand, group name GPN1 is a group name correlated with a start code or a return code transmitted from the optical communication display apparatus 1 or the optical communication apparatus 30 that the other person are wearing. In this case, only a group name is stored along with a time stamp.

When a communication log is stored in such a manner, by counting log information, ranking information can be obtained. FIG. 23B shows an example of which a communication log is counted for example for one month of March and ranking data of group names are generated. By extracting log data of for example March 2007 based on time stamps and counting group names from the log data, ranking data that represent counts of group names are generated. The ranking data become data that represent counts of group names of groups to which persons, signboards, and so forth the user watched belong. As a counting method, by extracting log data of for example persons (log data that do not include signboard IDs) and counting the log data, the ranking data become information that represents the number of times the user met persons and group names of groups to which the persons belong. By extracting log data containing signboard IDs and counting the log data, the ranking data become information that represents the number of times the user watched signboards and group names of groups to which the signboards belong. FIG. 23C shows ranking data that represent counts of signboard IDs extracted for example based on time stamps in a predetermined period of time. This ranking data become information that represents the number of times the user watched signboards having signboard IDs. Thus, the ranking data represent signboards in which the user has an interest. When the ranking data of commercial product IDs, exhibit IDs, or the like instead of signboard IDs, the ranking data become information that represents commercial products or the like in which the user has an interest. In addition, the ranking information becomes information that represents commercial products or the like that the user watched many times.

There may be many output formats of the generated ranking data. For example, the display section 2 shown in FIG. 5 or FIG. 6 may display ranking data according to a user's operation. In addition, a recoding section having a portable record medium such as an optical disc or a memory card may be added. When the supervisor or the like attaches the portable record medium to another reproducing apparatus, he or she can watch the ranking data with another reproducing apparatus. When a communication section is added, ranking data can be transmitted. As a result, the supervisor or the like can watch the ranking data with the reception side apparatus.

Figure 24:
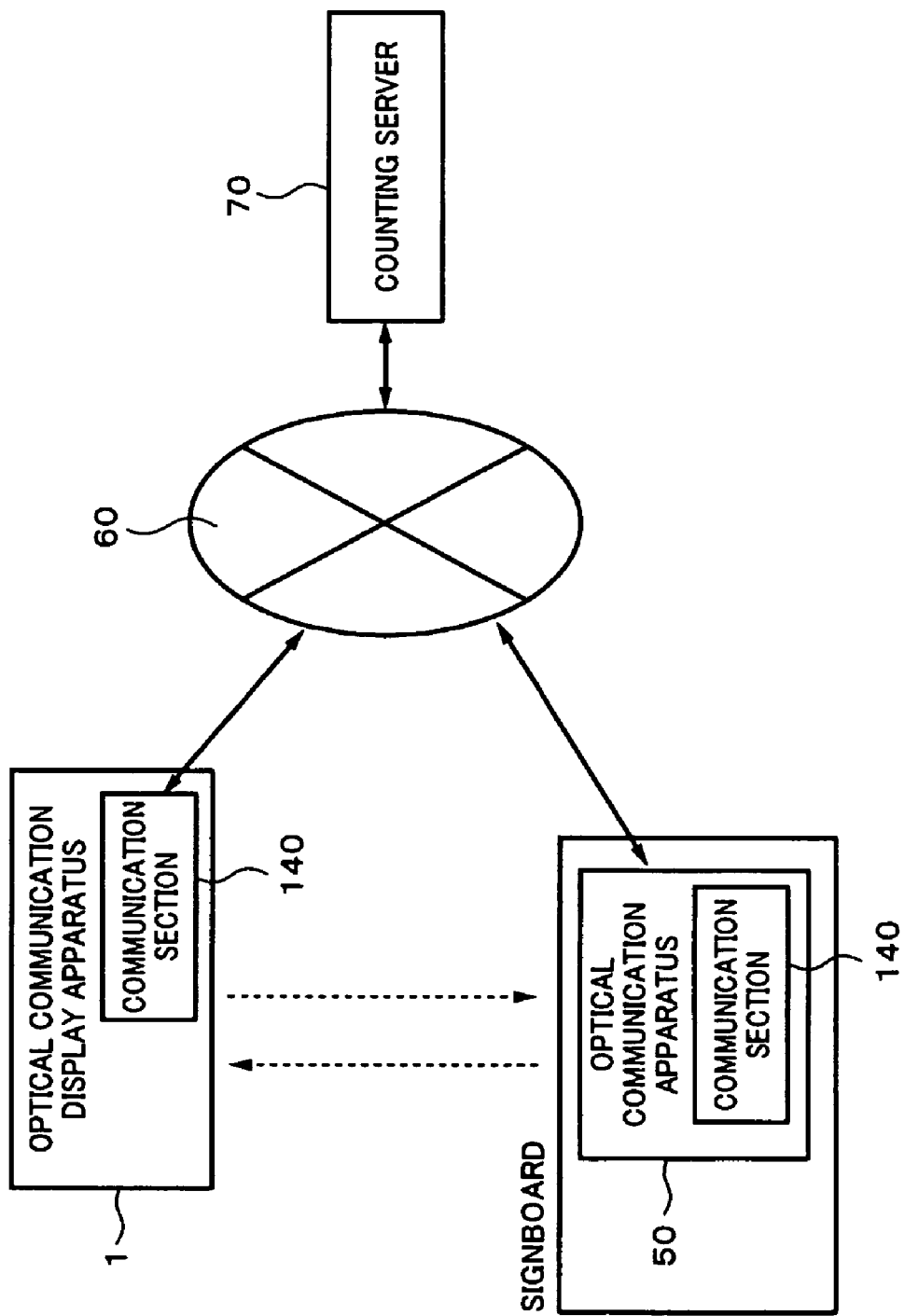
FIG. 24 is a schematic diagram describing a system including a counting server according to an embodiment of the present invention.

Next, a system having a counting server that counts log data of the optical communication display apparatus 1 or the optical communication apparatus 30 of many users and log data of the optical communication apparatus 50 mounted on many apparatus-mounted objects will be described. FIG. 24 shows a structure of the system. The optical communication display apparatus 1 (or the optical communication apparatus 30 (not shown)) that a person wears has a communication section 140 in addition to the structure shown in FIG. 5 (or FIG. 6). Moreover, the optical communication apparatus 50 mounted on the apparatus-mounted object such as a signboard has the communication section 140 in addition to the structure shown in FIG. 7. The transmission sections 14 of the optical communication display apparatus 1, the optical communication apparatus 30, and the optical communication apparatus 50 can communicate with a counting server 70 through a network 60. It can be contemplated that examples of the network 60 include the Internet, a mobile phone communication network, a PHS network, an ad hock network, and a LAN.

The optical communication display apparatus 1 and the optical communication apparatus 50 or the optical communication display apparatus 1 (or the optical communication apparatus 30) that persons wear exchange a start code, a return code, providing data, and so forth through optical communications. Log data generated through optical communications are transmitted to the counting server 70 through the network 60. Thus, the counting server 70 collects log data from many optical communication display apparatus 1 (or many optical communication apparatus 30) and many optical communication apparatus 50 and performs a collecting process for them.

Figure 25:
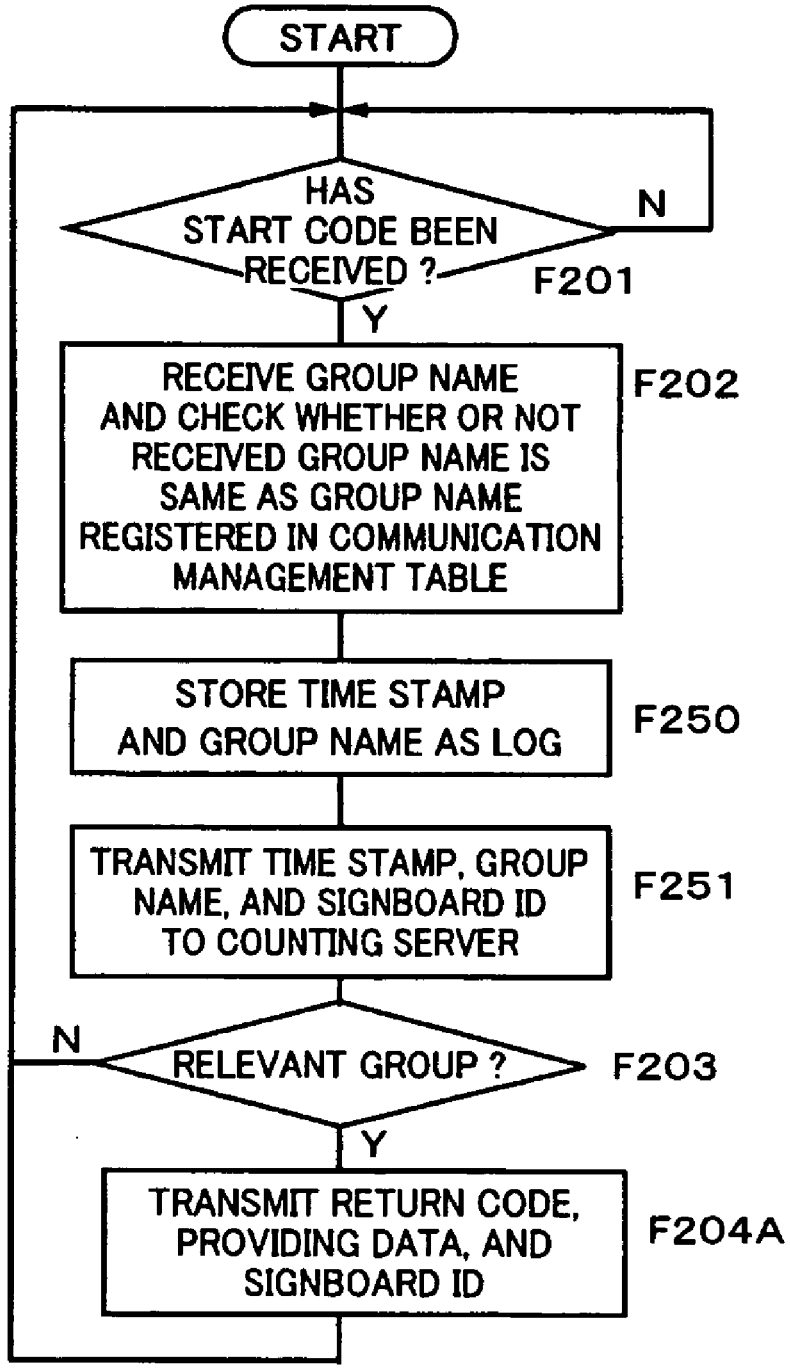
FIG. 25 is a flow chart showing an example of a process of an optical communication apparatus mounted on an apparatus-mounted object according to an embodiment of the present invention, the process including a process of storing a log and a process of transmitting the log.

As an example of a process of the system shown in FIG. 24, FIG. 25 shows an example of a process of the system controller 10 of the optical communication apparatus 50 mounted on the apparatus-mounted object such as a signboard. In FIG. 25, step F251 is added to the process shown in FIG. 20. When a start code has been received, the flow advances to step F250. At step F250, log data containing a time stamp and a group name is stored. Thereafter, the flow advances to step F251. At step F251, the time stamp and the group name as the log data and a signboard ID are transmitted from the communication section 140 to the counting server 70.

When the optical communication apparatus 50 mounted on each signboard performs the process shown in FIG. 25, log information (a time stamp and a group name) of each signboard ID is collected in the counting server 70. In other words, the counting server 70 can collect log data from many optical communication apparatus 50, counts the collected log data, and generates various types of ranking data. For example, the counting server 70 can generate ranking data that represent hobbies and preferences (group names) of persons who watched signboards having signboard IDs. For example, the counting server 70 can generate ranking data that represent counts of group names for example for one signboard ID. In addition, the counting server 70 can generate ranking data that represent counts of signboard IDs of signboards that persons watched. In other words, the counting server 70 can generate ranking data that represent counts of signboard IDs of signboards (group names) that persons watched. In addition, the counting server 70 can generate ranking data that represent counts of signboard IDs of signboards that persons who belong to groups having group names watched. In other words, the counting server 70 can generate ranking data that represent counts of signboard IDs for a particular group. When the locations or the like of signboards can be identified with signboard IDs, the counting server 70 can generate ranking data that represent counts of locations. When log data of signboard IDs of signboards located around the Hachiko Dog at Shibuya station are extracted and counted, the counting server 70 can generate ranking data that represent counts of signboards that persons watched many times around the Hachiko Dog at Shibuya station. In other words, the counting server 70 can generate ranking data that represent counts of signboard IDs of signboards located around the Hachiko Dog. When log data of signboard IDs of signboards that persons who belong to a particular group name watched at a particular location are extracted and counted, the counting server 70 can generate ranking data that represent counts of signboard IDs of signboards that persons who belong to a group having a particular group name watched at a particular location.

In the counting process of the counting server 70, various types of information about signboards for example an advertisement effect of signboards that persons watched many times, a tendency of group names of groups to which persons who watched signboards belong, an advertisement effect at each location, and an advertisement effect of each signboard at a particular location. Of course, the counting server 70 can generate beneficial ranking data for commercial products and exhibits rather than signboards.

Figure 26B:
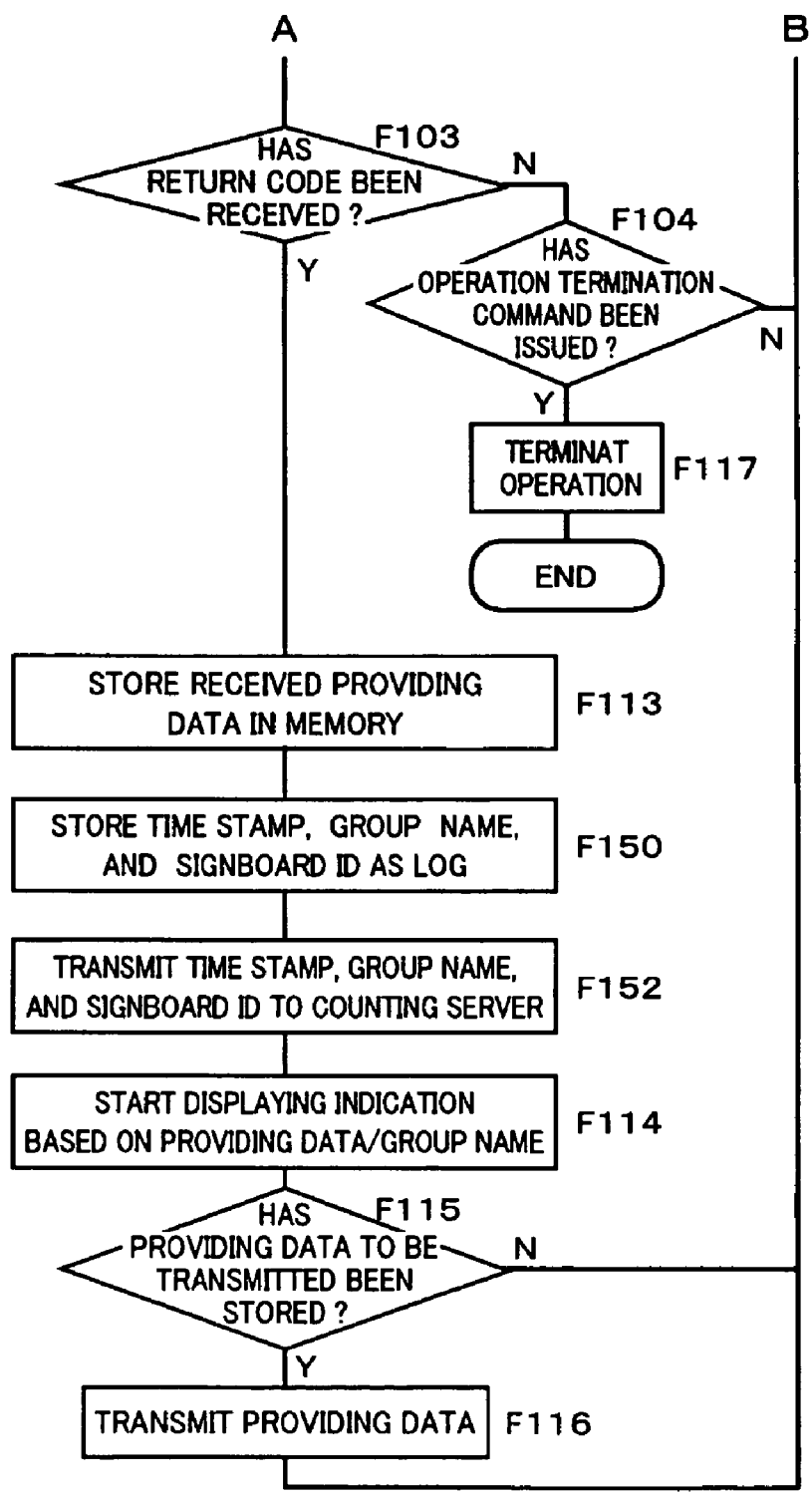
FIG. 26 is a flow chart showing an example of a process of an optical communication display apparatus or an optical communication apparatus according to an embodiment of the present invention, the process including a process of storing a log and a process of transmitting the log.

FIG. 26 shows an example of a process of the system controller 10 of the optical communication display apparatus 1 or the optical communication apparatus 30 that a person wears on the basis of the system shown in FIG. 24. In the process shown in FIG. 24, steps F152 and F153 are added to the process shown in FIG. 22. In other words, when a start code has been received, the flow advances to step F151. At step F151, log data containing a time stamp, a group name, and a signboard ID are stored. Thereafter, the flow advances to step F153. At step F153, the time stamp, group name, and signboard ID as log data are transmitted from the communication section 140 to the counting server 70.

When a return code has been received, log data containing a time stamp, a group name, and a signboard ID are stored at step F150. Thereafter, the flow advances to step F152. At step F152, the time stamp, group name, and signboard ID of the log data are transmitted from the communication section 140 to the counting server 70. When log data that do not contain a signboard ID are generated in communications between users, it can be contemplated that the transmission process at step F152 or F153 is not performed.

When the optical communication display apparatus 1 or the optical communication apparatus 30 performs the process shown in FIG. 26, log information (a time stamp, a group name, and a signboard ID) of the optical communication display apparatus 1 or the optical communication apparatus 30 of many users is collected in the counting server 70. The counting server 70 can count the collected log information and generate various types of ranking information. In this case, the counting server 70 can generate ranking data that represent hobbies and preferences (group names) that persons who watched each signboard having a signboard ID have. In addition, the counting server 70 can generate ranking data that represent counts of signboard IDs of signboards that persons watched. In other words, the counting server 70 can generate ranking data that represent the number of times persons watched each signboard having a signboard ID. In addition, when the locations or the like of signboards can be identified with signboard IDs, the counting server 70 can generate ranking data that represent counts of locations of signboards that persons watched.

In other words, in this case, as in the process shown in FIG. 25, beneficial ranking data that represent advertisement effects of signboards and tendencies of persons who watched them, ranking data that represent counts of locations of signboards that persons watched, ranking data that represent counts of signboards that persons watched at a particular location, and other ranking data. Of course, when the counting server 70 collects log data that contain commercial product IDs and exhibit IDs instead of signboard IDs, the counting server 70 can generate ranking data that represent indexes such as attractivity of these commercial products and so forth.

A counting process based on a communication log has been described. Various types of ranking data as counted results become important research data with respect to advertisement activities and commodity sales and become data that represent tendencies of users' personal activities. In particular, the optical communication display apparatus 1 or the optical communication apparatus 50 perform optical communications with the optical communication apparatus 50 mounted, for example, on a signboard when a person watches the signboard. With respect to signboards, commercial products, and so forth, log data are stored and counted upon an event in which a person watches a signboard or a commercial product. Thus, the reliability of ranking data is very high with respect to advertisement effects and attractivity and the ranking data become information based on actual situations.

It should be understood by those skilled in the art that various modifications, combinations, sub-combinations and alternations may occur depending on design requirements and other factors insofar as they are within the scope of the appended claims or the equivalents thereof.

What is claimed is:

1. An optical communication apparatus, comprising:
light transmission means for causing a light emitting portion, which outputs light in a visual line direction of a user, to transmit information;
light reception means for causing a light receiving portion, which receives light from the visual line direction of the user, to receive information;
display means in the visual line direction of the user for displaying an image and viewing therethrough, the display means having controllable transmissivity; and
control means for determining whether or not another optical communication apparatus is an information communication target based on identification information when the light reception means has optically received communication request information and the identification information from the other optical communication apparatus and causing the light transmission means to optically transmit communication response information to the other optical communication apparatus when the control means has determined that the other optical communication apparatus be the information communication target.

2. The optical communication apparatus as set forth in claim 1, further comprising:
storage means for storing providing information,
wherein the control means causes the light transmission means to optically transmit the providing information stored in the storage means along with the communication response information when the control means has determined that the other optical communication apparatus is the information communication target.

3. The optical communication apparatus as set forth in claim 1, further comprising:
storage means for storing providing information,
wherein the control means causes the light transmission means to optically transmit the providing information stored in the storage means when the light reception means has received the communication request information optically transmitted from the other optical communication apparatus.

4. The optical communication apparatus as set forth in claim 1, further comprising:
image capturing means for capturing the visual line direction of the user as an object direction,
wherein the control means causes the light transmission means to optically transmit communication request information and own identification information to the other optical communication apparatus according to an analysis result of the image capturing means.

5. The optical communication apparatus as set forth in claim 1,
wherein when the optical communication apparatus has a plurality of entries of own identification information, the control means causes the light transmission means to optically transmit communication request information and all or a selected part of the plurality of entries of own identification information.

6. The optical communication apparatus as set forth in claim 1, further comprising:
storage means for storing a communication management table with which at least the identification information is managed,
wherein the control means references the communication management table and determines whether or not the other optical communication apparatus is the information communication target when the light reception means has received the communication request information and the identification information optically transmitted from the other optical communication apparatus.

7. The optical communication apparatus as set forth in claim 6,
wherein the communication management table is configured to correlatively manage the identification information and the communication response information, and
wherein the control means causes the light transmission means to optically transmit the communication response information correlated with the identification information on the communication management table when the control means has determined that the other optical communication apparatus be the information communication target.

8. The optical communication apparatus as set forth in claim 6,
wherein the communication management table is configured to correlatively manage the identification information and the providing data, and
wherein the control means causes the light transmission means to optically transmit the providing data correlated with the identification information on the communication management table when the control means has determined that the other optical communication apparatus be the information communication target.

9. The optical communication apparatus as set forth in claim 1,
wherein the identification information is information about a group, and
wherein the control means determines that the other optical communication apparatus be the information communication target when the control means has recognized that the other optical communication apparatus belongs to the group which is the group to which the optical communication apparatus belongs, the recognition based on the identification information optically transmitted from the other optical communication apparatus.

10. The optical communication apparatus as set forth in claim 1,
wherein the control means performs a process of storing the identification information as communication history information when the light reception means has received the identification information.

11. The optical communication apparatus as set forth in claim 10,
wherein the control means performs a counting process of counting the communication history information so as to generate counted data for each entry of the identification information.

12. The optical communication apparatus as set forth in claim 10, further comprising:
communication means for performing a data communication with an external apparatus,
wherein the control means causes the communicating means to transmit the communication history information to an external counting server.

13. An optical communication method, comprising the steps of:
causing a light receiving portion which receives light from a visual line direction of a user to receive communication request information and identification information optically transmitted from another optical communication apparatus;
determining whether or not the other optical communication apparatus is an information communication target based on the received identification information;
displaying on a display in the visual line direction of the user at least a portion of data received from another optical communication apparatus, wherein the transmissivity of the display is controllable for viewing therethrough; and
causing a light emitting portion which outputs light in the visual line direction of the user to optically transmit communication response information when it has been determined that the other optical communication apparatus be an information communication target at the determining step.

* * * * *